United States Patent
Yi et al.

(10) Patent No.: US 9,983,722 B2
(45) Date of Patent: May 29, 2018

(54) MOBILE TERMINAL AND CONTROL METHOD THEREOF

(71) Applicant: LG ELECTRONICS INC., Seoul (KR)

(72) Inventors: Sohoon Yi, Seoul (KR); Yoonchan Won, Seoul (KR); Seulah Lee, Seoul (KR); Minjoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 15/151,382

(22) Filed: May 10, 2016

(65) Prior Publication Data
US 2017/0052628 A1 Feb. 23, 2017

(30) Foreign Application Priority Data

Aug. 17, 2015 (KR) .......................... 10-2015-0115614

(51) Int. Cl.
*H04N 5/222* (2006.01)
*G06F 3/041* (2006.01)
*G06F 3/0488* (2013.01)
*G06F 1/16* (2006.01)
*G06F 3/0481* (2013.01)
(Continued)

(52) U.S. Cl.
CPC ............ *G06F 3/0416* (2013.01); *G06F 1/165* (2013.01); *G06F 1/1626* (2013.01); *G06F 3/0412* (2013.01); *G06F 3/0488* (2013.01); *G06F 3/04817* (2013.01); *H04N 5/225* (2013.01); *H04N 5/23293* (2013.01); *G06F 2203/04104* (2013.01); *G06F 2203/04803* (2013.01)

(58) Field of Classification Search
CPC .................................................. H04N 5/23293
USPC ...................................... 348/333.02; 345/174
See application file for complete search history.

(56) References Cited

U.S. PATENT DOCUMENTS 8,754,855 B2 * 6/2014 Duncan ............... G06F 3/04883
345/173
2011/0210907 A1 9/2011 Martin-Cocher et al.
(Continued)

FOREIGN PATENT DOCUMENTS

EP 2874053 5/2015
KR 10-2015-0080454 7/2015

OTHER PUBLICATIONS

European Patent Application No. 16181082.5, Search Report dated Dec. 14, 2016, 7 pages.

*Primary Examiner* — Anthony J Daniels
(74) *Attorney, Agent, or Firm* — Lee, Hong, Degerman, Kang & Waimey PC

(57) ABSTRACT

The present invention relates to a mobile terminal having a plurality of display areas and a control method thereof. A mobile terminal according to the present invention includes a display unit provided with a first display area and a second display area, and a controller configured to process a touch applied to another display area in an inactive state as a control command for one display area in an active state, when the touch is applied to the another display area in the inactive state while the one of the first and second display areas is in the active state and the another display area is in the active state. Here, the active state is a state of allowing an output of visual information and touch sensing, and the inactive state is a state of restricting an output of visual information and allowing touch sensing.

12 Claims, 26 Drawing Sheets

(51) Int. Cl.
*H04N 5/225* (2006.01)
*H04N 5/232* (2006.01)

(56) References Cited

U.S. PATENT DOCUMENTS

| | | | | |
|---|---|---|---|---|
| 2014/0168119 A1* | 6/2014 | Esaki | ............... | G06F 3/0488 345/173 |
| 2014/0372896 A1* | 12/2014 | Raman | ............... | G06F 3/0488 715/741 |
| 2015/0138046 A1 | 5/2015 | Moon | | |
| 2015/0317120 A1* | 11/2015 | Kim | ............... | G06F 3/1438 345/1.3 |
| 2015/0378557 A1* | 12/2015 | Jeong | ............... | G06F 3/0488 715/835 |
| 2016/0162058 A1* | 6/2016 | You | ............... | G06F 3/03547 345/157 |

* cited by examiner (a)

(b)

(a)

(b)

(a)

(b)

MOBILE TERMINAL AND CONTROL METHOD THEREOF

CROSS-REFERENCE TO RELATED APPLICATION

Pursuant to 35 U.S.C. § 119(a), this application claims the benefit of earlier filing date and right of priority to Korean Application No. 10-2015-0115614, filed on Aug. 17, 2015, the contents of which is incorporated by reference herein in its entirety.

BACKGROUND OF THE INVENTION

Terminals may be divided into mobile/portable terminals and stationary terminals according to their mobility. Also, the mobile terminals may be classified into handheld terminals and vehicle mount terminals according to whether or not a user can directly carry the terminal.

Mobile terminals have become increasingly more functional. Examples of such functionality include data and voice communication, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As terminals become increasingly multifunctional, a mobile terminal may capture still images or moving images, play music or video files, play games, receive broadcast and the like, so as to be implemented as an integrated multimedia player.

Efforts are ongoing to support and increase the functionality of mobile terminals. Such efforts include software and hardware improvements, as well as changes and improvements in the structural components.

Various types or shapes of mobile terminals are also under development. That is, mobile terminals with rectangular displays have been widespread, however, active development of various shapes of display units, for example, are recently underway.

Accordingly, requirements for development of corresponding user experiences (UXs) and/or user interfaces (UIs) which can be applied to the various types of display units, in addition to terminals having a single display area, are considered.

SUMMARY OF THE INVENTION

Therefore, an aspect of the detailed description is to provide a mobile terminal having a plurality of display areas, and a control method thereof.

Another aspect of the detailed description is to provide convenience in controlling a mobile terminal through a plurality of display areas.

Another aspect of the detailed description is to provide a mobile terminal, capable of inputting a control command for one of a plurality of display areas through another area, and a control method thereof.

Another aspect of the detailed description is to allow a plurality of functions to be executed at once on a mobile terminal, in a manner of performing different functions for the mobile terminal on a plurality of display areas, respectively.

To achieve these and other advantages and in accordance with the purpose of this specification, as embodied and broadly described herein, there is provided a mobile terminal including a display comprising a first display area and a second display area, and a controller configured to process a touch to one of the first display area or the second display area while the one display area is in an inactive state and the other display area of the first display area or the second display area is in an active state, wherein the touch is processed as a control command for the other display area, allow display of information or touch sensing during the active state, and restrict display of information or touch sensing during the inactive state.

In one exemplary embodiment of the present invention, the controller may cause the second display area to display information in response to a touch applied to the first display area while the first display area is in the inactive state and the second display area is in the active state.

In one exemplary embodiment of the present invention, the controller is further configured to change the displayed information on the second display area in response to the touch to the first display area.

In one exemplary embodiment of the present invention, the controller is further configured to cause the second display area to differently display the displayed information based on a touch attribute of the touch to the first display area, the touch attribute corresponding to a touch direction, a touch type, a touch length, or a number of touches.

In one exemplary embodiment of the present invention, the controller is further configured to cause the second display area to display notification information related to an event when the event is generated while the first display area is in the inactive state, and detailed information related to the event when a first touch is applied to the first display area in the inactive state.

In one exemplary embodiment of the present invention, the controller is further configured to cause at least part of the first display area to display at least one function icon for executing a function associated with the event in response to a second touch to the first display area while the detailed information is displayed on the second display area.

In one exemplary embodiment of the present invention, the controller is further configured to cause the second display area to display a plurality of function icons, execute a specific function corresponding to one of the plurality of function icons in response to a first touch to the first display area in the inactive state, wherein the specific function is executed from the plurality of function icons based on a position of the first touch to the first display area.

In one exemplary embodiment of the present invention, the controller is further configured to process a first touch to the first display area in the inactive state as a control command for a specific operation mode wherein the first touch is received while information related to the specific operation mode is displayed on the second display area.

In one exemplary embodiment of the present invention, the specific operation mode is one of a plurality of operation modes comprising a watch mode and a camera mode, and the controller is further configured to cause the second display area to switch from displaying information of a first mode of the plurality of operation modes to displaying information of a second mode of the plurality of operation modes in response to a second touch to the first display area, wherein the second touch is received while the second display area is displaying information of the first mode.

In one exemplary embodiment of the present invention, the controller is further configured to cause the second display area to display first screen information, and cause at least part of the first display area to display second screen information related to the first screen information in response to a first touch to the first display area in the inactive state while the first screen information is displayed on the second display area.

In one exemplary embodiment of the present invention, the first screen information is related to an image capture function, and the controller is further configured to activate the image capture function and cause at least part of the first display area to display a preview image captured via the camera in response to the first touch.

In one exemplary embodiment of the present invention, the controller is further configured to capture an image via the camera in response to a second touch consecutive to the first touch to the first display area.

In one exemplary embodiment of the present invention, the second display area is located at a first side of the first display area.

In accordance with another exemplary embodiment of the present invention, a mobile terminal may include a display comprising a first display area and a second display area, and a controller configured to process a touch to a specific display area of the first or the second display area as a control command for the other display area of the first or the second display area, wherein the specific display area is in an active state or an inactive state and the other display area is in the active state, and wherein different screen information is displayed on the first display area and the second display area.

In an exemplary embodiment of the present invention, the controller is further configured to cause the first display area to display an object associated with the second display area in response to a preset input, process a touch within the displayed object as a control command associated with the second display area, and process a touch outside the displayed object as a control command associated with the first display area.

In an exemplary embodiment of the present invention, the controller is further configured to cause the second display area to display a plurality of function icons associated with operation modes of the mobile terminal, and change the mobile terminal to an operation mode corresponding to a selected function icon of the plurality of function icons in response to a touch to the displayed object on the first display area.

In an exemplary embodiment of the present invention, the operation modes of the mobile terminal comprise at least a flight mode, a WiFi mode, a camera operation mode, or an external device control mode.

In an exemplary embodiment of the present invention, the controller is further configured to cause the first display area to display screen information related to a first application, cause the second display area display screen information related to a second application different from the first application, and process a touch to the first display area as a control command associated with the screen information related to the second application on the second display area.

In an exemplary embodiment of the present invention, the controller is further configured to allow display of information and touch sensing during the active state, and restrict display of information and touch sensing during the inactive state.

In an exemplary embodiment of the present invention, a method for controlling a mobile terminal comprising a display having a first display area and a second display area may include receiving a touch to the first display area while the first display area is in an inactive state and the second display area is in an active state, and processing the touch to the first display area as a control command associated with the second display area.

To achieve these and other advantages and in accordance with the purpose of this specification, as embodied and broadly described herein, there is provided a method for controlling a mobile terminal comprising a display unit provided with a first display area and a second display area, the method including receiving a touch applied to the first display area, while the first display area is in an inactive state and the second display area is in an active state, and processing the touch received on the first display area as a control command for the second display area, wherein the active state is a state of allowing an output of visual information and touch sensing, and wherein the inactive state is a state of restricting an output of visual information and allowing touch sensing.

To achieve these and other advantages and in accordance with the purpose of this specification, as embodied and broadly described herein, there is provided a mobile terminal including a display unit provided with a first display area and a second display area, and a controller configured to process a touch applied to another display area in an inactive state as a control command for one display area in an active state, when the touch is applied to the another display area in the inactive state while the one of the first and second display areas is in the active state and the another display area is in the active state, wherein the active state is a state of allowing an output of visual information and touch sensing, and wherein the inactive state is a state of restricting an output of visual information and allowing touch sensing.

In one exemplary embodiment of the present invention, the controller may control information output on the second display area, in response to a touch applied to the first display area, when the touch is applied to the first display area while the first display area is in the inactive state and the second display area is in the active state.

In one exemplary embodiment of the present invention, the information output on the second display area may change in response to the touch applied to the first display area.

In one exemplary embodiment of the present invention, the controller may perform different controls for the information output on the second display area, on the basis of a touch attribute of the touch applied to the first display area. The touch attribute may include a touch direction, a touch type, a touch length and a number of touches.

In one exemplary embodiment of the present invention, the second display area may output thereon notification information notifying an event generation when the event is generated while the first display area is in the inactive state. The second display area may output thereon detailed information related to the generated event when a first touch is applied to the first display area in the inactive state.

In one exemplary embodiment of the present invention, the controller may activate at least part of the first display area and output at least one function icon for executing a function associated with the event on the activated at least part of the first display area, when a second touch different from the first touch is applied to the first display area while the detailed information related to the generated event is output on the second display area.

In one exemplary embodiment of the present invention, the controller may execute a function corresponding to one of a plurality of function icons, based on a touch-applied position, when the touch is applied to the first display area in the inactive state while the plurality of function icons are output on the second display area.

In one exemplary embodiment of the present invention, the controller may process a first touch applied to the first display area in the inactive state as a control command associated with one of a plurality of operation modes, when the first touch is applied to the first display area in the inactive state while information related to the one operation mode is output on the second display area.

In one exemplary embodiment of the present invention, the plurality of operation modes may include a watch type mobile terminal control mode and a camera mode. The controller may switch information related to the watch type mobile terminal control mode output on the second display area into information related to the camera mode, when a second touch having a different touch attribute from the first touch is applied to the first display area while the information related to the watch type mobile terminal control mode is output on the second display area. The controller may process the first touch applied to the first display area as a control command associated with the camera mode.

In one exemplary embodiment of the present invention, the controller may output second screen information related to first screen information on at least part of the first display area when a first touch is applied to the first display area in the inactive state while the first screen information is output on the second display area.

In one exemplary embodiment of the present invention, the first screen information may be information related to an image capture function, and the controller may activate the image capture function and output a preview image input through a camera on at least part of the first display area when the first touch is applied to the first display area.

In one exemplary embodiment of the present invention, the controller may capture an image input through the camera when a second touch consecutive to the first touch is applied to the first display area.

In one exemplary embodiment of the present invention, the second display area may be located at one side of the first display area based on the first display area.

In accordance with another exemplary embodiment of the present invention, a mobile terminal may include a display unit provided with a first display area and a second display area, and a controller configured to process a touch applied to one of the first and second display areas as a control command for another display area, wherein the one display area is in one of an active state and an inactive state and the another is in the active state, and wherein different screen information is output on each of the first and second display areas.

In an exemplary embodiment of the present invention, the first display area may output thereon an image object for receiving a touch associated with the second display area based on a use request. The controller may process a touch applied to the image object on the first display area as a control command associated with the second display area. The controller may process a touch applied to a point out of the image object on the first display area as a control command associated with the first display area.

In an exemplary embodiment of the present invention, the second display area may output thereon a plurality of function icons associated with operation modes of the mobile terminal. One of the function icons may be selected in response to a touch applied to the image object, and the controller may execute an operation mode corresponding to the selected function icon.

In an exemplary embodiment of the present invention, the operation mode of the mobile terminal may include at least one of a flight mode, a WiFi mode, a camera operation mode and an external device control mode.

In an exemplary embodiment of the present invention, the first display area may output thereon screen information related to a first application, and the second display area may output thereon screen information related to a second application, different from the first application. The controller may process a touch applied to the first display area as a control command associated with the screen information related to the second application output on the second display area, on the basis of a user request.

In an exemplary embodiment of the present invention, the active state may be a state of allowing an output of visual information and touch sensing, and the inactive state may be a state of restricting an output of visual information and allowing touch sensing.

To achieve these and other advantages and in accordance with the purpose of this specification, as embodied and broadly described herein, there is provided a method for controlling a mobile terminal comprising a display unit provided with a first display area and a second display area, the method including receiving a touch applied to the first display area, while the first display area is in an inactive state and the second display area is in an active state, and processing the touch received on the first display area as a control command for the second display area, wherein the active state is a state of allowing an output of visual information and touch sensing, and wherein the inactive state is a state of restricting an output of visual information and allowing touch sensing.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present invention, that which is well-ix) known to one of ordinary skill in the relevant art has generally been omitted for the sake of brevity. The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
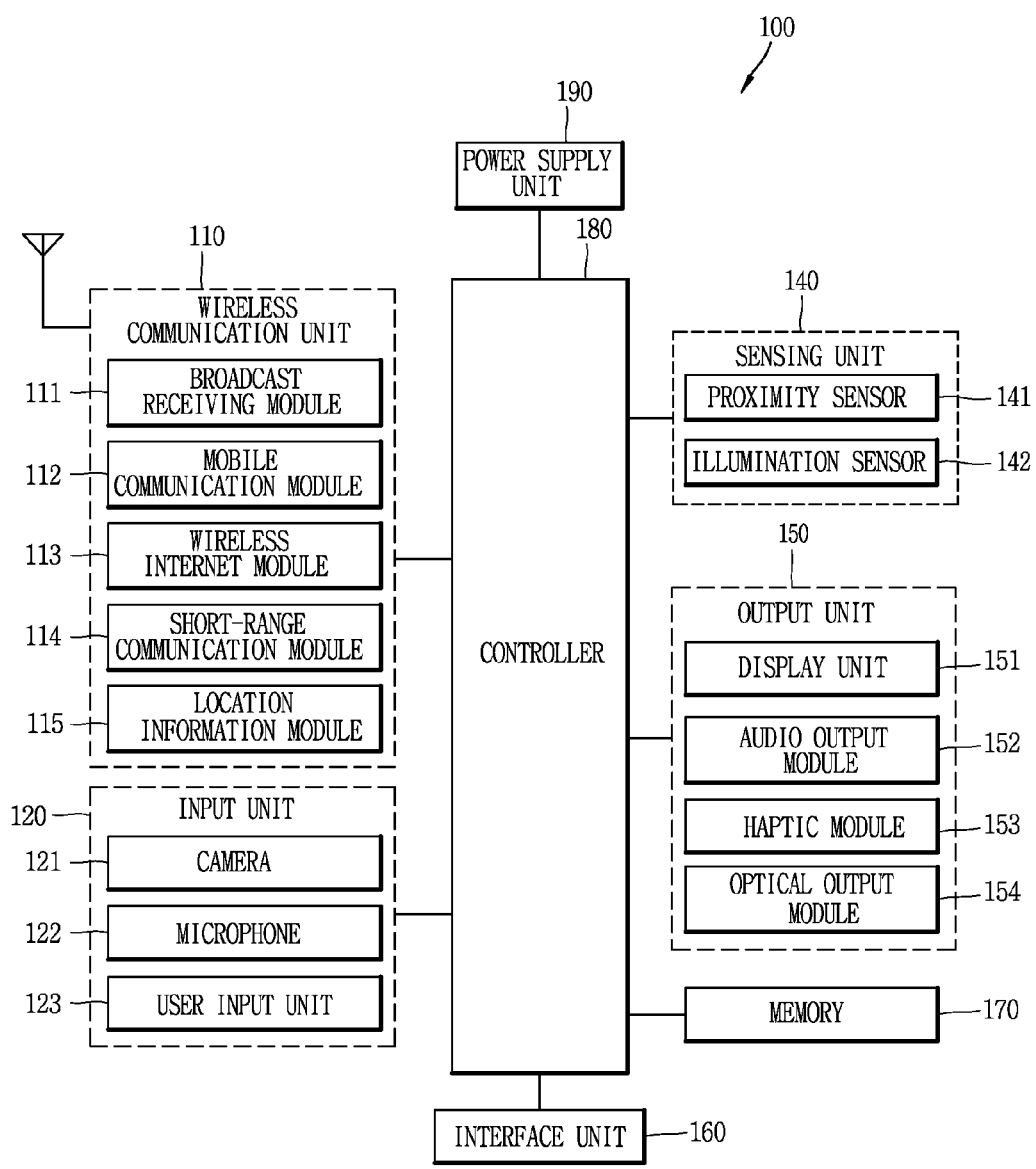
FIG. 1A is a block diagram of a mobile terminal in accordance with one exemplary embodiment of the present invention.
Figure 1B:
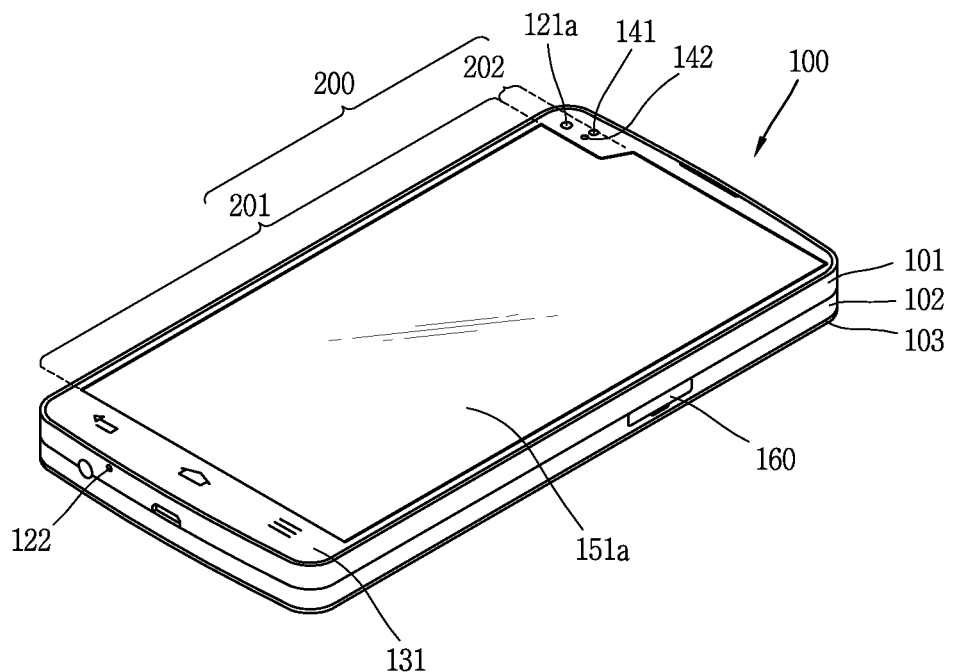
FIGS. 1B and 1C are conceptual views illustrating one example of a mobile terminal, viewed from different directions.
Figure 1C:
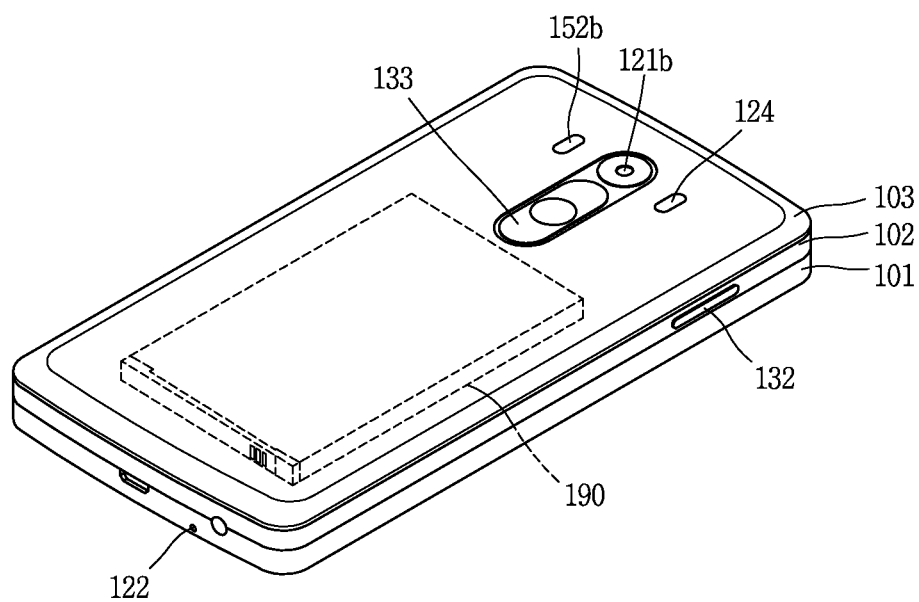

Referring to FIGS. 1A to 1C, FIG. 1A is a block diagram of a mobile terminal in accordance with one exemplary embodiment of the present invention, and FIGS. 1B and 1C are conceptual views illustrating one example of a mobile terminal, viewed from different directions.

The mobile terminal 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 may control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Wideband CDMA (WCDMA), High Speed Downlink Packet access (HSDPA), High Speed Uplink Packet Access (HSUPA), Long Term Evolution (LTE), LTE-advanced (LTE-A) and the like).

Examples of the wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LET-A, and the like, as part of a mobile communication network, the wireless Internet module 113 performs such wireless Internet access and may be understood as a type of the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may be configured to permit various types of inputs to the mobile terminal 120. Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped by, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two or more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, considering the mobile terminal 100 as at least one set, the terminal body may be understood as a conception referring to the set.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery, an identification module, a memory card, and the like. A rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, or combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring call sounds to a user's ear and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule alarm, an email reception, information reception through an application, and the like. When a user has checked a generated event, the controller 180 can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a push (or mechanical) key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap at least partially with a corresponding position of the display unit 151 of the front side of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

When the rear input unit is provided on the rear surface of the terminal body, a new type of user interface using the rear input unit can be implemented. Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint.

The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a.

The second camera 121b can include a plurality of lenses arranged along at least one axis. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191 from an external impact or from foreign material. When the battery 191 is detachable from the terminal body, the rear case 103 may be detachably coupled to the rear case 102.

An accessory for protecting the appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend functionality of the mobile terminal 100. Another example of the accessory is a touch pen for assisting or extending a touch input to a touch screen.

Meanwhile, the mobile terminal having a single display area has been described so far. A mobile terminal according to another embodiment of the present invention may include a plurality of display areas. That is, the mobile terminal may provide convenience in controlling a mobile terminal through the plurality of display areas.

Figure 2:
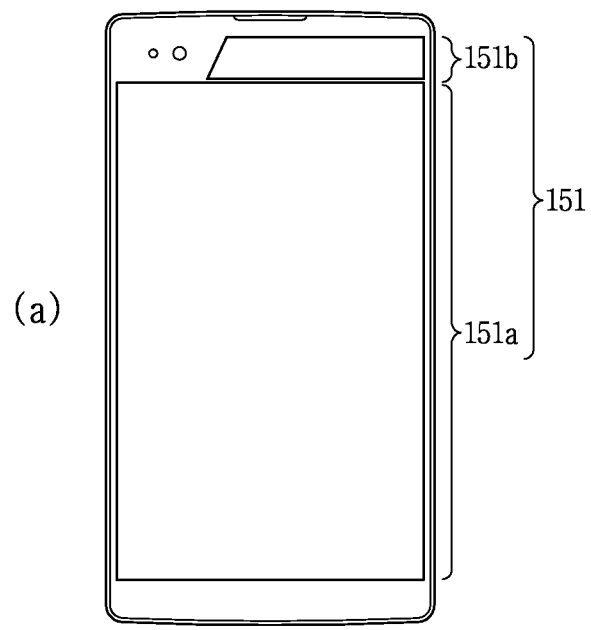
FIGS. 2, 3A and 3B are conceptual views illustrating a plurality of display areas provided on a mobile terminal in accordance with an embodiment of the present invention.
Figure 2:
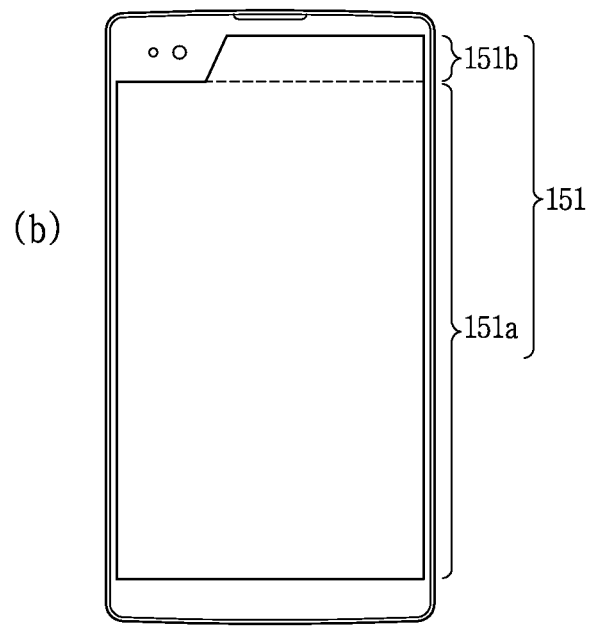
Figure 3A:
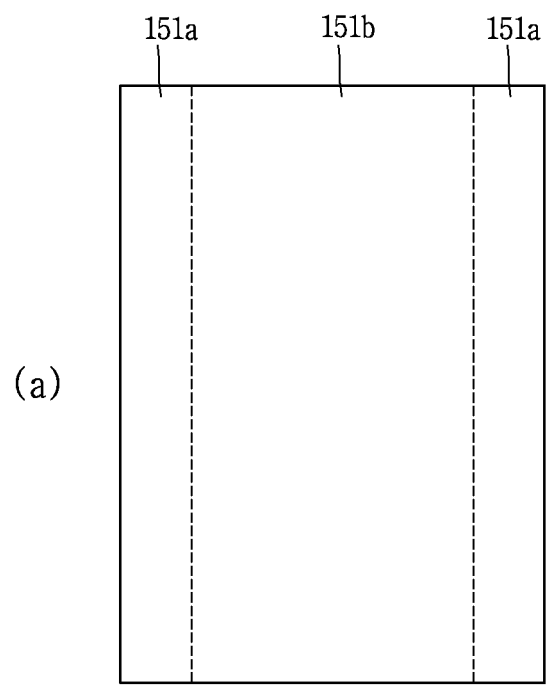
Figure 3A:
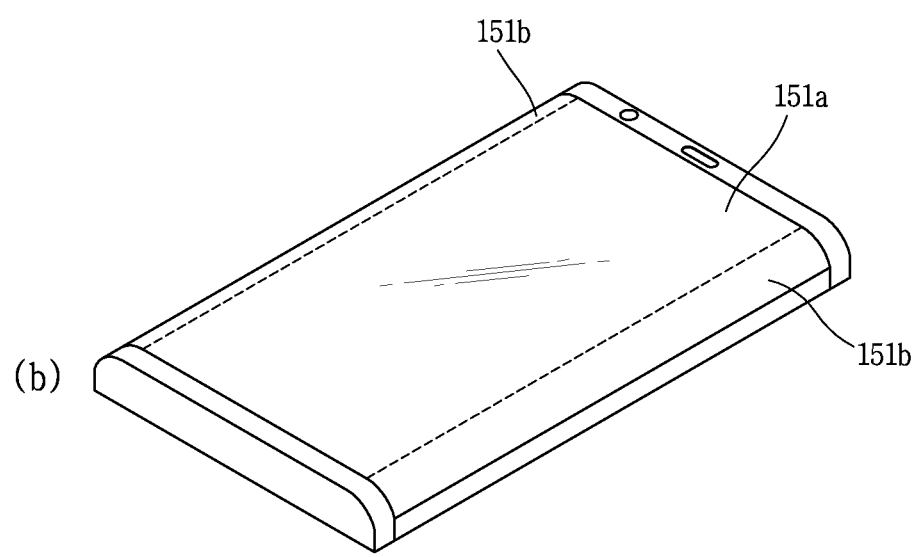
Figure 3B:
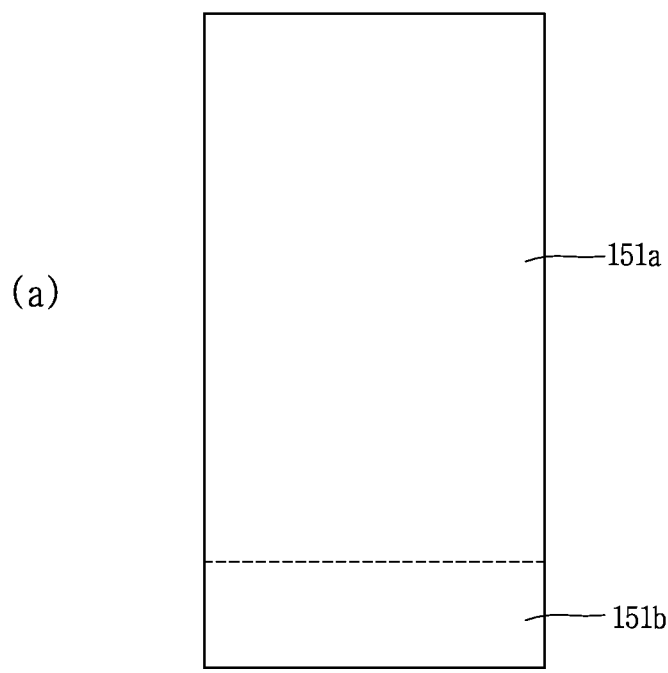
Figure 3B:
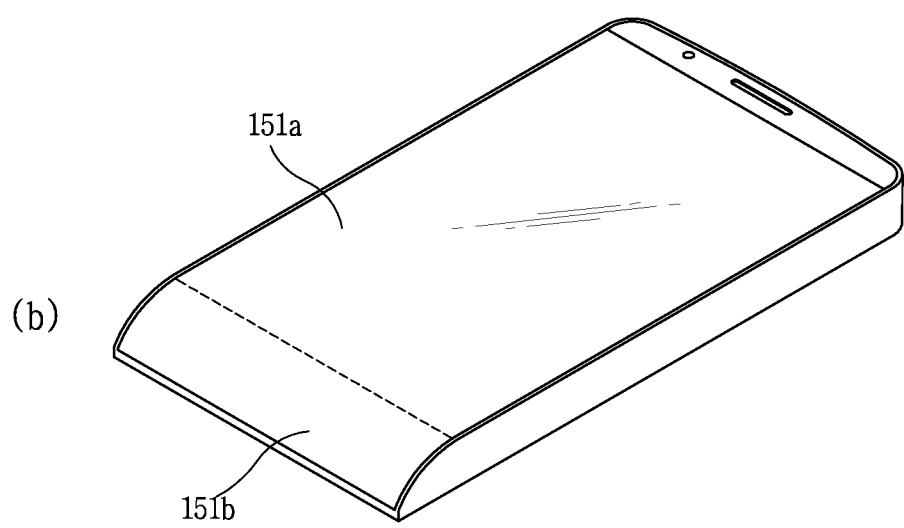

Hereinafter, description will be given in more detail of examples of a mobile terminal having a plurality of display areas, with reference to the accompanying drawings. FIGS. 2, 3A and 3B are conceptual views illustrating a plurality of display areas provided on a mobile terminal in accordance with an embodiment of the present invention.

First, as illustrated in FIG. 2, a display unit 151 of a mobile terminal may include a plurality of display areas 151a and 151b (hereinafter, referred to as first and second display portions). Here, the first and second display portions 151a and 151b may have the same area, the same shape, or both. Alternatively, the first and second display portions 151a and 151b may have different areas, different shapes or both. For example, the area of the first display portion 151a may be greater than the area of the second display portion 151b. As illustrated, the second display portion 151b may have a different shape from the first display portion 151a.

Meanwhile, the first and second display portions 151a and 151b, as illustrated in (a) of FIG. 2, may have physically independent structures from each other. In this instance, the mobile terminal 100 may be provided with a plurality of display portions (e.g., two display portions) that are physically separated from each other. When the mobile terminal is provided with the plurality of display portions that are physically separated from each other, the controller controls each of the plurality of display portions. In this instance, a sub controller may be allocated to each display portion for control thereof. That is, in the mobile terminal, the first display portion 151a may be controlled by a first sub controller, and the second display portion 151b may be controlled by a second sub controller. The first and second sub controllers may be controlled by a main controller. As another example, the physically separated first and second display portions 151a and 151b may also be controlled by one controller.

Meanwhile, the first and second display portions 151a and 151b, as illustrated in (b) of FIG. 2, may be included in the single display unit 151. That is, the single display unit 151 may include the plurality of display areas 151a and 151b. In this instance, a boundary between the plurality of display areas 151a and 151b may be defined through software processing. The controller 180 may output a specific image at a boundary area between the plurality of display areas 151a and 151b to help the user recognize the boundary between the plurality of display areas 151a and 151b.

In this instance, the plurality of display areas 151a and 151b may be controlled, independent of each other, through software processing.

As described above, the mobile terminal according to the present invention may be provided with a plurality of display areas (or a plurality of display portions, hereinafter, referred to as 'a plurality of display areas') through a physical division or software division.

The plurality of display areas may have various arrangements. The second display area 151b may be located at one side of the first display area 151a. When the first and second display areas 151a and 151b are provided on a single display unit, the second display area 151b may extend from one side of the first display area 151a.

As one example, referring to (a) and (b) of FIG. 2, the display unit 151 according to the present invention may have a structure extending upwardly from the first display area 151a in a lengthwise direction. That is, the second display area 151b may be located above the first display area 151a as shown in FIG. 2.

In this instance, as illustrated, a horizontal length of the second display area 151b may be shorter than or equal to that of the first display area 151a. An embodiment of the present invention exemplarily illustrates that the horizontal length of the second display area 151b is shorter than that of the first display area 151a. In this instance, the camera 121, the proximity sensor 151 and the illumination sensor 142 that are located on an upper bezel of the display unit 151 in FIGS. 1B and 1C may be disposed at a left side (or a right side) of the second display area 151b, as illustrated in FIG. 2(b).

When the horizontal length of the second display area 151b is longer than that of the first display area 151a, one side of the second display area 151b may be formed to be straight, inclined, or curved.

As another example, as illustrated in (a) and (b) of FIG. 3A, the second display area 151b may extend in a horizontal direction of the terminal so as to be formed at at least one of a left side and a right side of the first display area 151a. In this instance, as illustrated in (b) of FIG. 3A, the second display area 151b may be formed as a curved surface or an inclined surface. Here, the second display areas 151b may be visible when the user views the mobile terminal 100 from a side of the mobile terminal 100 as well as from a front side of the mobile terminal 100.

As another example, referring to (a) and (b) of FIG. 3B, the display unit 151 according to the present invention may have a structure of extending downwardly from the first display area 151a in a lengthwise direction. That is, the second display area 151b may be located below the first display area 151a. In this instance, as illustrated in (b) of FIG. 3B, the second display area 151b may be formed as a curved surface or an inclined surface. Here, the second display area 151b may be visible when the user views the mobile terminal 100 from a side of the mobile ix) terminal 100 as well as from a front side of the mobile terminal 100.

Meanwhile, the plurality of display areas according to the present invention may have various arrangements and shapes in addition to those aforementioned. In addition, the aforementioned display areas may be configured by a plurality of display portions physically divided or may be a plurality of display areas provided on a single display unit.

Meanwhile, the present invention may execute the same function or obtain an effect by an independent control for each area, irrespective of whether the plurality of display areas are formed as a plurality of display portions or correspond to a plurality of areas included in a single display unit. Therefore, description will be given without distinguishing whether or not the plurality of display areas are formed as the plurality of display portions or correspond to the plurality of areas included in the single display unit.

Figure 4A:
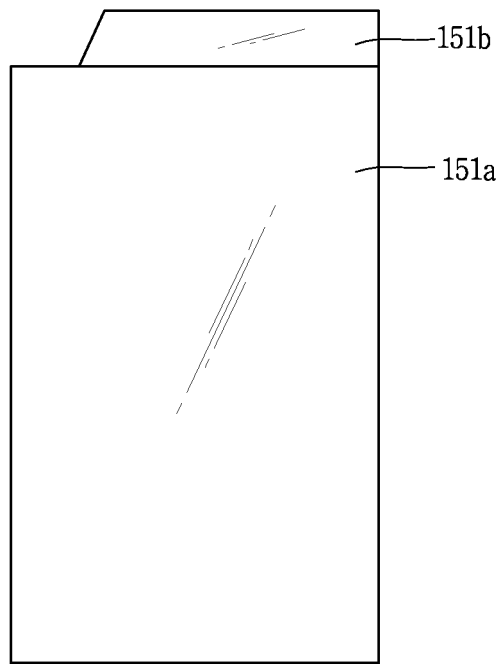
FIGS. 4A, 4B, and 4C are conceptual views illustrating operating states of a plurality of display areas in a mobile terminal in accordance with an embodiment of the present invention.
Figure 4B:
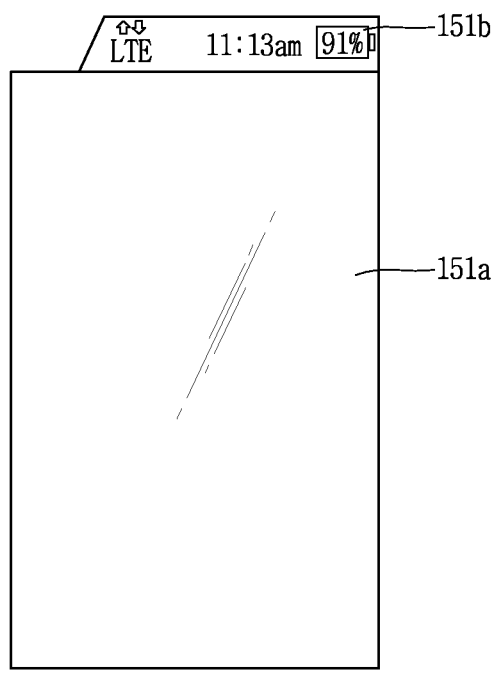
Figure 4C:
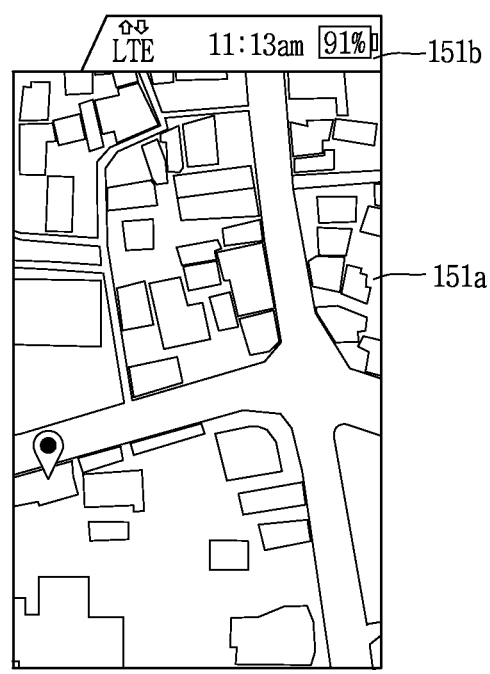

The plurality of display areas may be controlled independently of each other. Hereinafter, embodiments of a method of controlling a plurality of display areas will be described in more detail with reference to the accompanying drawings. FIGS. 4A to 4C are conceptual views illustrating operating states of a plurality of display areas in a mobile terminal in accordance with the present invention.

In the mobile terminal according to an embodiment of the present invention, the plurality of display areas may have the same operating state or different operating states.

Here, a plurality of display areas may be driven into one of an active state and an inactive state. The active state may refer to a state of enabling an output of visual information and enabling touch sensing. That is, the active state refers to a state that a corresponding display area is turned on.

In addition, the inactive state may refer to a state of restricting an output of visual information. That is, the display unit or a light source illuminating the display unit is turned off. Meanwhile, a display area in the inactive state may still be sensitive to touch. The inactive state may refer to a state of restricting an output of visual information and still being sensitive to touch. In some embodiments, the controller 180 may control a display area in the inactive state to be sensitive to touch.

The inactive state of restricting the output of visual information and still being sensitive to touch may be referred to as a "doze" mode. A corresponding display area may be represented as being in the doze mode. The display area in the doze mode may be activated at a preset specific period.

A touch sensor may sense a tap applied to the display unit in a different manner in the inactive state (or the doze mode) or in the active state. In addition, settings related to an operation of the touch sensor may be differently set in the inactive state (or the doze mode) than in the active state.

For example, threshold values for recognizing touches may be differently set. That is, sensitivity of the touch sensor in response to a touch may increase more in the active state than in the inactive state (or the doze mode). This is because the inactive state (or the doze mode) is a mode for sensing a touch while reducing power consumption and the active state is a mode for accurately sensing a user input.

In the inactive state, when an initial touch is sensed, the controller 180 may operate a touch sensor corresponding to a display area in the inactive state for the same sensing period as for a touch sensing period of the display area when it is in the active state. Thus the accuracy of a touch applied to the display area even in the inactive state is increased.

A touch sensor of the display area in the inactive state may operate at different touch sensing periods. For example, the touch sensor may sense a touch at a first frequency before an initial touch is applied. When the initial touch is applied, the touch sensor may sense the touch at a second frequency faster than the first frequency. While the touch sensor operates at the second frequency, the controller 180 may operate the touch sensor at the second frequency until a succeeding touch is not applied for a preset time.

Thus, the embodiments of the present invention may vary the operating method of the touch sensor which may result in minimization of power consumption and improvement of touch accuracy of the mobile terminal.

In other embodiments, each of the plurality of display areas of the mobile terminal may be driven in the active state or the inactive state.

For example, as illustrated in FIG. 4A, both of the first and second display areas 151a and 151b may be in the inactive state. Here, at least one of the first and second display areas 151a and 151b may be sensitive to touch even though the display or its light source is off. For example, the second display area 151b may be sensitive to touch even in the inactive state. Here, when a preset touch is sensed on the second display area 151b, the controller 180 may output screen information corresponding to the touch on at least the second display area 151b and/or the first display area 151a.

As another example, referring to FIG. 4B, one of the first and second display areas 151a and 151b may be in the active state and the other may be in the inactive state. That is, the first and second display areas 151a and 151b may be controlled independent of each other, so as to have different operating states from each other. Therefore, the operating state of one of the first and second display areas 151a and 151b may not be affected by the operating state of the other. That is, the plurality of display areas may not always collectively be in the active state or in the inactive state.

In other embodiments, one of the plurality of display areas may always be in the active state. In this instance, the display area always in the active state may be referred to as being 'always on.' For example, as illustrated in FIG. 4B, the second display area 151b may always be maintained in the active state, irrespective of whether the first display area 151a is in the active state or in the inactive state. The always on display area may also be changed to the inactive state according to a remaining battery level of the mobile terminal.

In the mobile terminal according to an embodiment of the present invention, when one of the plurality of display areas is in the active state and another one is in the inactive state, a touch applied to the inactive state display area may be processed as a control command for the active state display area. For example, screen information output on the second display area 151b in the active state may be scrolled in response to a touch applied to the first display area 151a in the inactive state.

As another example, referring to FIG. 4C, the first and second display areas 151a and 151b may both be in the active state. The first and second display areas 151a and 151b may be switched from the inactive state to the active state at the same time or at different time points.

The controller 180 may control the first and second display areas 151a and 151b independently. In this embodiment, the first and second display areas 151a and 151b may output different screen information such that information which is output on one of the plurality of display areas 151a and 151b may not affect information output on another display and information output on the first display area 151a may be different from information output on the second display area 151b. For example, the first display area 151a may output an execution screen of a first application, and the second display area 151b may output an execution screen of a second application. On the first display area 151a, a control command (for example, a touch input) for controlling information output on the first display area 151a may not affect information output on the second display area 151b. Thus, on the first display area 151a, when a touch for scrolling information output on the first display area 151a is applied, the controller 180 may scroll only the information output on the first display area 151a but may not scroll information output on the second display area 151b.

As described above, the first and second display areas 151a and 151b may have the same operating state or different operating states.

The selection of a display unit from the first and second display areas 151a and 151b to be operated in the active state or maintained in the inactive state may be carried out based on a user selection or via the controller 180. The first and second display areas 151a and 151b may be switched from the active state to the inactive state or from the inactive state into the active state, in response to a user input applied to a predetermined hardware key (e.g., a power button) provided on a terminal body. Here, the controller 180 may simultaneously control the first and second display areas 151a and 151b in response to the user input via the predetermined hardware key.

The active state and the inactive state of each of the first and second display areas 151a and 151b may independently be switched based on a preset touch to the corresponding display area. For example, while both of the first and second display areas 151a and 151b are in the active state, the first display area 151a may be switched from the active state into the inactive state when a preset touch is applied to the first display area 151a. The second display area 151b may remain in the active state. Here, the preset touch may be a touch having a preset touch pattern. The preset touch pattern may include a number of touches, a touch position, a touch type such a long touch, a short touch, a drag touch, a flick touch, and the like.

In another embodiment, only one of the first and second display areas 151a and 151b may be activated or deactivated in response to a user input to a predetermined hardware key (e.g., a power button) provided on the terminal body. In this instance, the predetermined hardware key may be allocated with a control command for switching only one of the first and second display areas 151a and 151b to the active or inactive state.

In one embodiment, the other display area of the first and second display areas which is not activated or changed to the inactive state by the predetermined hardware key may be controlled by another hardware key which is different from the predetermined hardware key. In another embodiment, the other display area may be switched into the active or inactive state in response to a touch input. For example, when a preset touch is applied to the other display area, the controller 180 may switch the other display area from the active state to the inactive state. Here, the active or inactive state of the one display area (linked with the predetermined hardware key) may be maintained. The preset touch may be a touch having a preset touch pattern. The preset touch pattern may include a number of touches, a touch position, or a touch type such as a long touch, a short touch, a drag touch, a flick touch, and the like.

Figure 5:
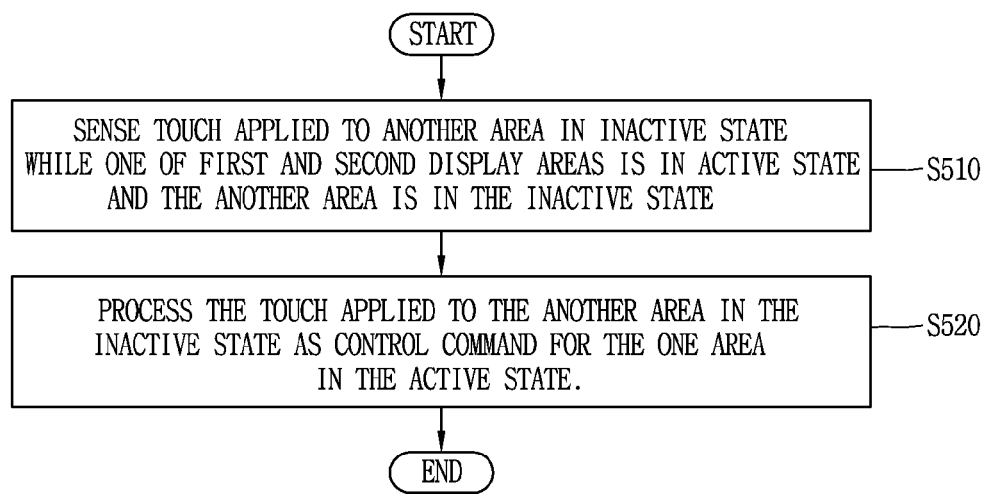
FIG. 5 is a conceptual view illustrating a control method for a plurality of display areas in a mobile terminal in accordance with an embodiment of the present invention.

Hereinafter, description will be given in more detail of a method of controlling the plurality of display areas based on the aforementioned embodiments, with reference to the accompanying drawings. FIG. 5 is a conceptual view illustrating a control method for a plurality of display areas in a mobile terminal in accordance with an embodiment of the present invention, and FIGS. 6A to 6E are conceptual views illustrating a method of controlling one of a plurality of display areas through another area in a mobile terminal in accordance with an embodiment of the present invention.

While one of a plurality of display areas is in an inactive state and another one is in an active state, a controller of the mobile terminal may process a touch applied to the inactive display area as a control command for the active display area. That is, a deactivated state display area can be used as an input element of an activated state display area.

In more detail, while one of the first or second display areas 151a and 151b is in an active state and the other is in an inactive state, a touch applied to the inactive state display area is sensed (S510). As aforementioned, a display area in an inactive state may be restricted from outputting visual information but still be sensitive to a touch input. That is, the controller 180 may control an inactive state display area to be sensitive to touch. This inactive state may be referred to as a doze mode, and in this instance, a corresponding display area may be referred to as being in the doze mode.

In an embodiment of the present invention, the touch applied to the inactive state display area is processed as a control command for the active state display area (S520). The control command for the active state display area may correspond to various types of control commands. For example, the control command may relate to changing information output on the active state display area or executing a function relating to the information output on the active state display area.

Hereinafter, description will be given in more detail of an example in which the first display area 151a is in the inactive state and the second display area 151b is in the active state.

The first display area 151a may be used as a main display and the second display area 151b may be used as a sub display. For example, a home screen page and an execution screen of an application (e.g., a video play screen, a map screen, etc.) output on the mobile terminal may be output on the first display area 151a being used as the main display. On the other hand, status information, event information, operation mode information, and the like related to the mobile terminal may be output on the second display area 151b being used as the sub display. In an embodiment of the present invention, the second display area 151b may be used as an area for controlling a state of the mobile terminal, a driving mode, an operation mode of the mobile terminal, checking an event, and the like. The first display area 151a may be used as an input element of the second display area 151b in order to enhance convenience of inputting control commands with respect to the second display area 151b.

In some embodiments, the second display area 151b may always be in the active state. In other embodiments, the second display area 151b may be switched from the inactive state to the active state in response to a preset touch applied to the second display area 151b, or the second display area 151b may also be switched from the inactive state to the active state in response to a preset touch applied to the first display area 151a in the inactive state. As another example, the second display area 151b may be switched from the inactive state to the active state in response to a preset touch applied to the second display area 151a in the active state. As another example, the second display area 151b may be switched from the inactive state to the active state in response to a user input applied to a preset key provided on the terminal body.

Figure 6A:
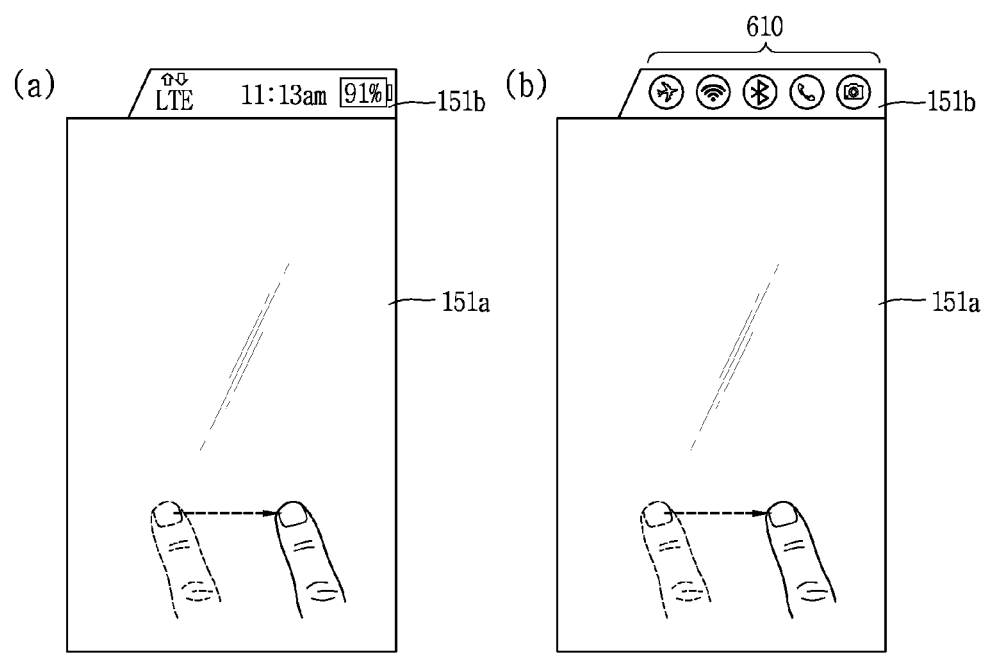
FIGS. 6A, 6B, 6C, 6D, and 6E are conceptual views illustrating a method of controlling a plurality of display areas through another area in a mobile terminal in accordance with an embodiment of the present invention.
Figure 6A:
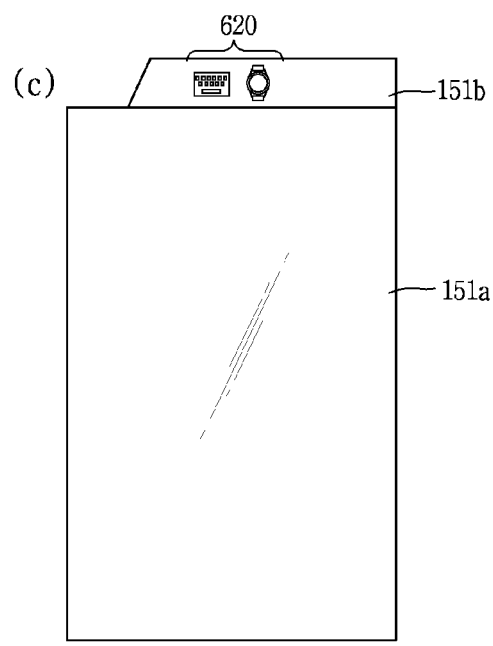

In one embodiment, referring to (a) of FIG. 6A, the second display area 151b may output status information related to the mobile terminal while the first display area 151a is in an inactive state. The status information may include information related to a current state or ambient environment of the mobile terminal. For example, the status information may include remaining battery level information, communication mode information (e.g., LTE, 3G, WiFi, etc.), communication signal strength information, current time information, information regarding a preset alarm function.

The controller 180 may change information output on the active state second display area 151b in response to a touch applied to the first display area 151a. Referring to (a) and (b) of FIG. 6A, the status information output on the second display area 151b may be changed to another screen information different from the status information. The controller 180 may output a function icon 610 corresponding to each function executable on the mobile terminal on the second display area 151b in response to the touch, as illustrated in (b) of FIG. 6A.

The function icons 610 may be selected in response to a touch applied to one of the first display area 151a or the second display area 151b. The controller 180 may output a function icon associated with an operation mode of the mobile terminal on the second display area 151b in response to the touch. For example, the operation mode of the mobile terminal may include a flight mode, a WiFi mode, a Bluetooth mode, a call mode, a camera mode, and the like.

In addition, the controller 180 may output function icons 620 associated with controlling an external device on the second display area 151b in response to the touch, as illustrated in (c) of FIG. 6A. Here, the function associated with controlling the external device may be associated with a watch type mobile terminal which is paired with the mobile terminal, or associated with a TV which is controlled based on a signal output by the mobile terminal. These are provided only by way of example, and various types of external terminals controllable by the mobile terminal are contemplated by this disclosure, thus these examples are not to be considered limiting.

In some embodiments, the mobile terminal may sequentially change information output on the second display area 151b in response to the touch applied to the first display area 151a, as illustrated in (a), (b) and (c) of FIG. 6A.

The controller 180 may also output information corresponding to the same category on the second display area 151b. For example, as illustrated in (b) of FIG. 6A, the function icons for controlling the operation of the mobile terminal may be output on the second display area 151b, or icons for controlling the external device may be output on the second display area 151b, as illustrated in (c) of FIG. 6A.

The foregoing description has been given of examples in which status information is output on the second display area 151b and the information output on the second display area 151b is changed in response to a touch applied to the first display area 151a. However, the output order of the information on the second display area 151b may vary, and the types of information illustrated in (a), (b) and (c) of FIG. 6A output on the second display area 151b may be different or random.

Figure 6B:
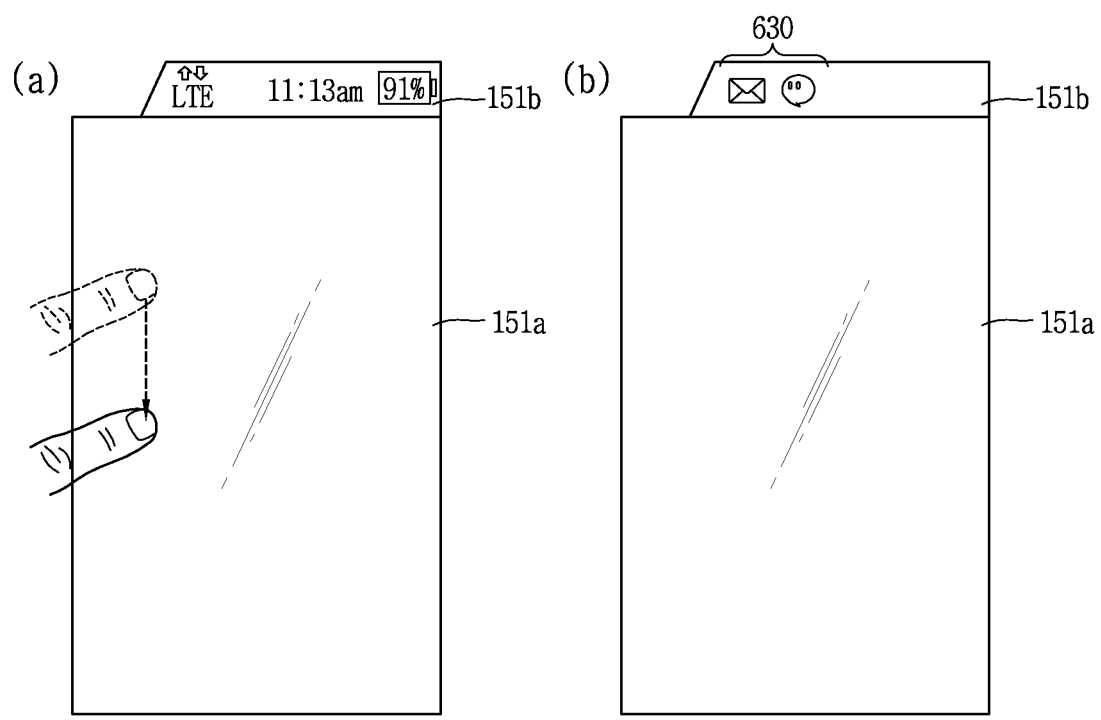

As another example, the controller 180 may output information 630, or cause information to be output, related to an event on the second display area 151b, as illustrated in (b) of FIG. 6B. While status information is output on the second display area 151b, the controller 180 may switch the status information to event-related information 630 in response to a touch applied to the first display area 151a (for example, see (a) of FIG. 6A). Here, the event-related information may include information related to currently-unchecked events among events that have been generated in the mobile terminal or received from external servers or external terminals.

Upon generation of an event, the controller 180 may preferentially output the event-related information over the status information. That is, when an event is generated, the controller 180 may output information related to the event on the second display area 151b even without an input of a specific control command for the first display unit 151a.

Different information may be output on the second display area 151b according to an attribute of a touch applied to the first display area 151a. Here, the touch attribute may include a touch type (a short touch, a long touch, a drag touch, a flick touch, and the like), a number of touches, a touch direction, a touch length, a touch position, and the like.

For example, the controller 180, as illustrated in FIG. 6A, may output information related to a control mode of the mobile terminal on the second display area 151*b* in response to a drag touch applied in a first direction (for discussion purposes, the "A" direction). As illustrated in FIG. 6B, the controller 180 may output event information on the second display area 151*b* in response to a drag touch applied in a second direction (for discuss purposes, the "B" direction) which is different from the A direction.

In an embodiment, the type of touch and the type of information to output based on the touch may be determined based on a user selection or under the control of the controller. Although not illustrated, the controller 180 may output on the display unit 151 guide information indicating the type of information to be output on the second display area 151*b* in response to each corresponding type of touch. The guide information may be output on at least one of the first and second display areas 151*a* and 151*b*.

Figure 6C:
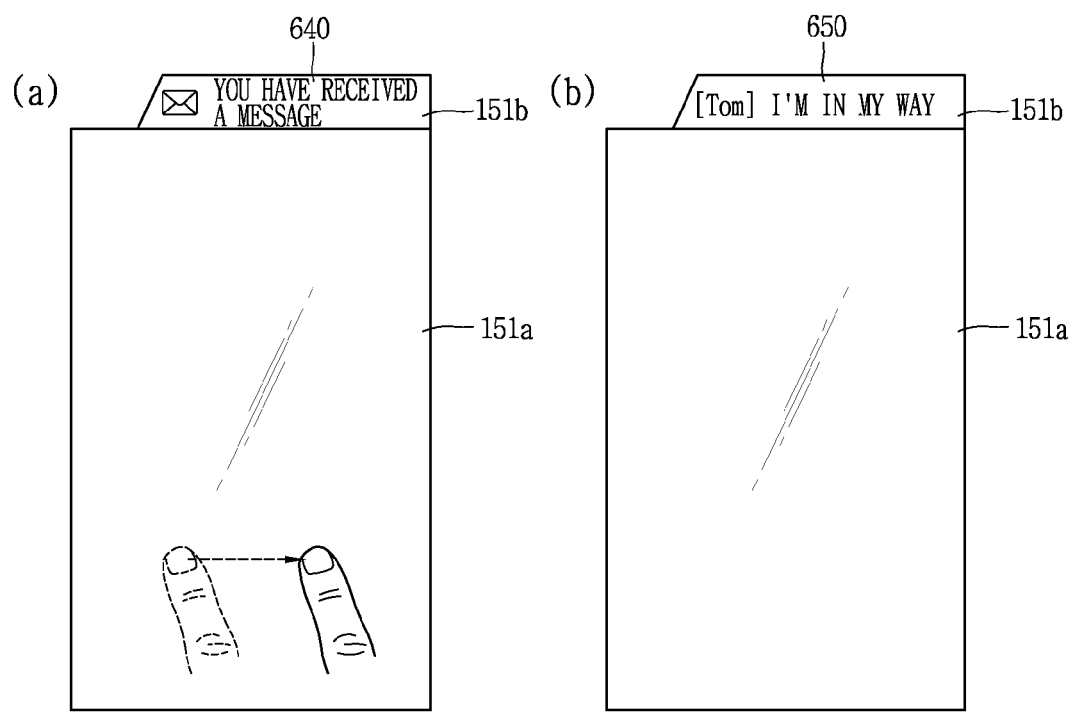

When an event is generated while the first display area 151*a* is in the inactive state, the controller 180, as illustrated in (a) of FIG. 6C, may output notification information 640 notifying the generation of the event on the second display area 151*b*. In addition, as illustrated in (b) of FIG. 6C, when a preset touch is applied on the inactive state first display area 151*a*, the controller 180 may additionally output information 650 related to the generated event on the second display area 151*b*. Here, the information related to the generated event may be detailed information related to the event. Also, the information related to the generated event may include contents of the event (e.g., contents of a received message for a message reception event). This embodiment may be implemented, sequential to the process illustrated in (b) of FIG. 6B, as aforementioned.

According to another embodiment of the present invention, when a plurality of function icons 611, 612, 613, 614 and 615 are output on the second display area 151*b*, one of the plurality of function icons 611, 612, 613, 614 and 615 may be selected by a touch applied to the first display area 151*a*. For example, as illustrated in (a) of FIG. 6D, the first display area 151*a* may be divided into a plurality of areas 620*a*, 620*b*, 620*c*, 620*d* and 620*e*, according to output positions and arrangements of the plurality of function icons 611, 612, 613, 614 and 615 on the second display unit 151*b*. When a preset touch is applied to one of the plurality of areas 620*a*, 620*b*, 620*c*, 620*d* and 620*e*, the controller 180 may execute a function corresponding to a function icon which corresponds to the area to which the touch is applied. That is, when a preset touch is applied to one of the plurality of areas 620*a*, 620*b*, 620*c*, 620*d* and 620*e*, the controller 180 may determine that a function icon corresponding to the touch-applied area has been selected.

Here, the plurality of areas 620*a*, 620*b*, 620*c*, 620*d* and 620*e* may be areas corresponding to output positions of the plurality of function icons 611, 612, 613, 614 and 615 in one direction. Although not illustrated, when a touch is applied to one of the plurality of areas 620*a*, 620*b*, 620*c*, 620*d* and 620*e*, the controller 180 may provide an effect of highlighting a function icon on the second display area 151*b* corresponding to the touch-applied area. Here, the highlighting effect may include changing a color of the corresponding icon, outputting a specific image in the vicinity of the corresponding icon, and the like. That is, when a touch is applied to one of the plurality of areas 620*a*, 620*b*, 620*c*, 620*d* and 620*e*, the controller 180 may highlight the function icon corresponding to the touch-applied area such that the user can recognize the icon which has been selected.

Figure 6D:
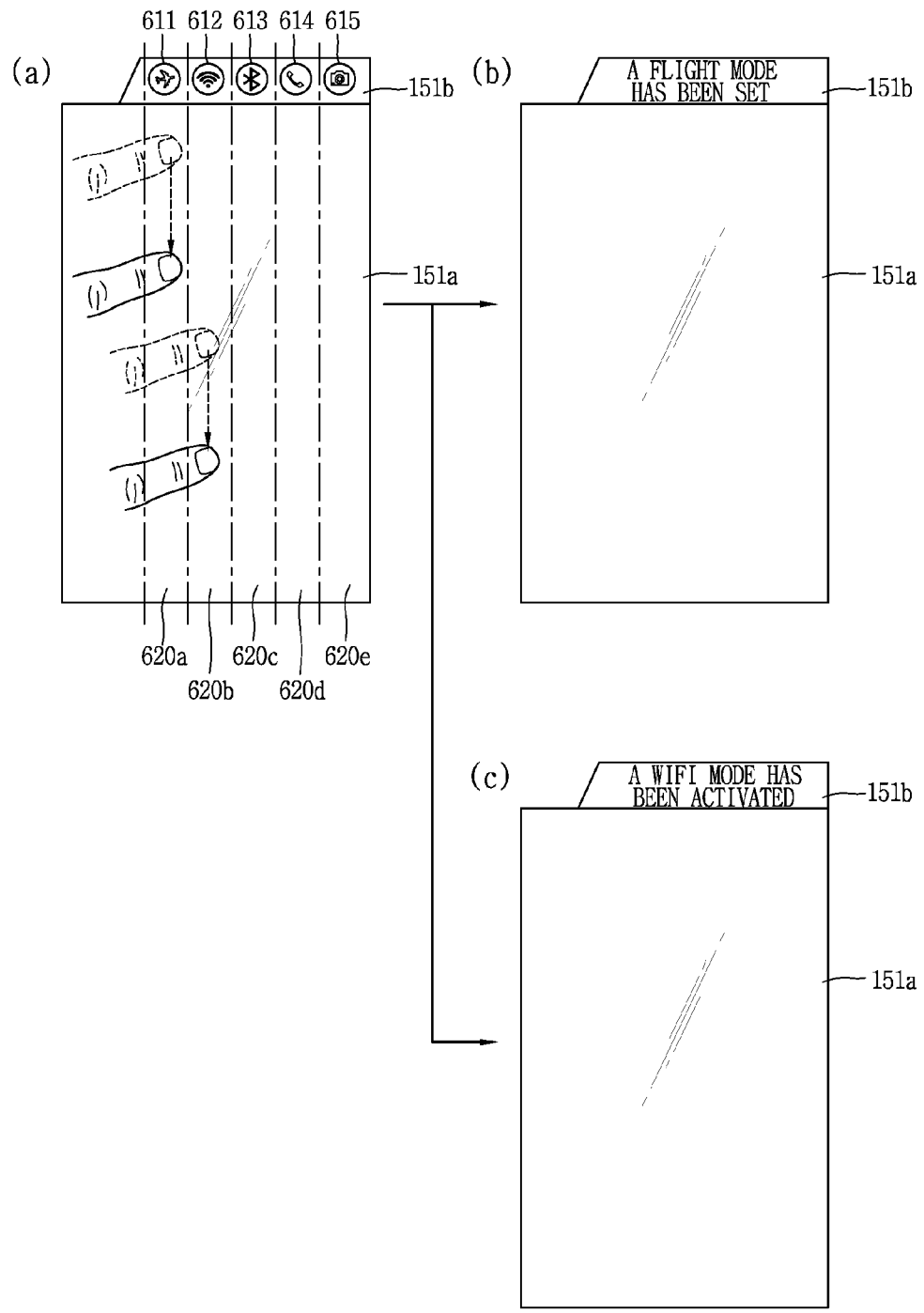
Figure 6E:
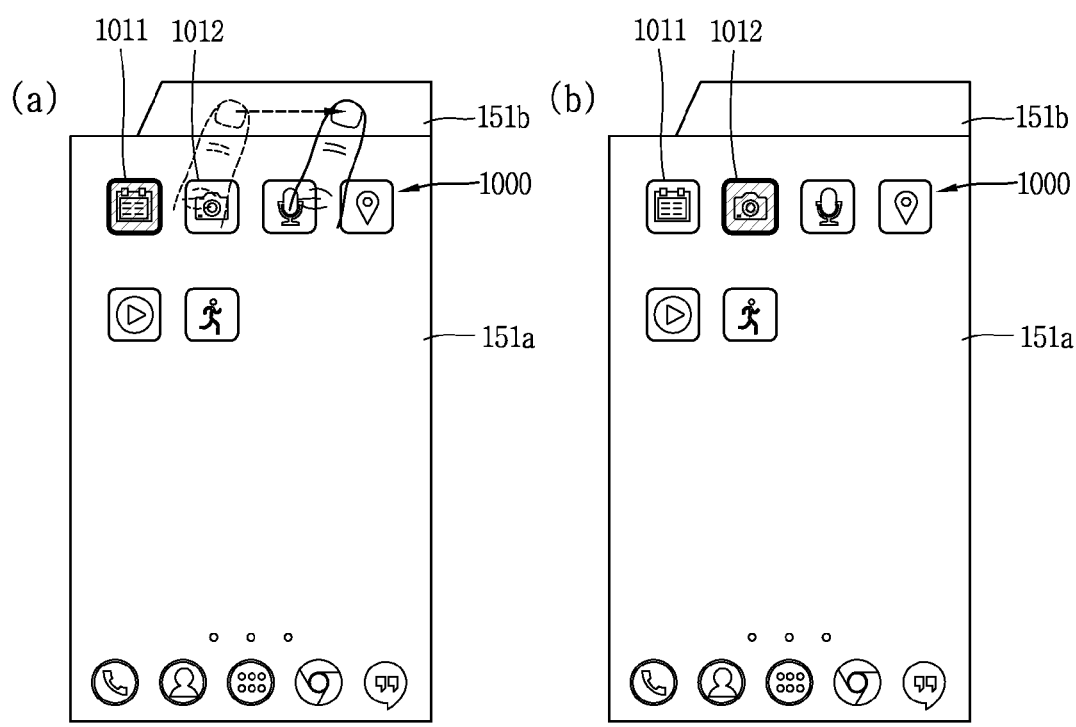

Meanwhile, as illustrated in (a) of FIG. 6D, when a preset touch (e.g., a drag touch applied in a preset direction) is applied to the first display area 151*a* at area 620*a* corresponding to a first function icon 611, the controller 180 executes a function corresponding to the first function icon 611, as illustrated in (b) of FIG. 6D. In this instance, when the first function icon 611 is a function associated with a flight mode, the controller 180 may set the mobile terminal to the flight mode as a result of the selection.

As another example, as illustrated in (a) of FIG. 6D, when a preset touch (e.g., a drag touch applied in a preset direction) is applied to the first display area 151*a* at area 620*b* which corresponds to an output area of a second function icon 612, the controller 180 executes a function corresponding to the second function icon 612, as illustrated in (c) of FIG. 6D. In this instance, when the second function icon 612 is a function associated with a WiFi mode, the controller 180 may switch a current state related to the WiFi mode of the mobile terminal. That is, when the WiFi mode of the mobile terminal is in the active state before the second function icon 612 is selected, the controller 180 may deactivate the WiFi mode in response to the selection. On the other hand, when the WiFi mode is in the inactive state before the selection of the second function icon 612, the controller 180 may activate the WiFi mode in response to the selection.

The foregoing embodiment has illustrated the method of processing the touch applied to the first display area 151*a* as the control command for the second display area 151*b* while the first display area 151*a* is in the inactive state and the second display area 151*b* is in the active state. However, the present invention may not be limited to this. In other embodiments as illustrated in (a) and (b) of FIG. 6E, while the second display unit 151*b* is in the inactive state and the first display area 151*a* is in the active state, the controller 180 may process a touch applied to the second display area 151*b* as a control command for the first display area 151*a*. For example, as illustrated, the controller 180 may select one of the icons included on the first display area 151*a*, in response to a touch applied to the second display area 151*b*. In addition, the controller 180 may utilize the second display area 151*b* as a touch pad for controlling the first display area 151*a*.

As described above, the mobile terminal according to the present invention may output information on the second display area 151*b* and execute a control of the information output on the second display area 151*b* in response to a touch applied to the first display area 151*a*. In this manner, embodiments of the present invention can output information by using the second display unit 151*b* which may be relatively smaller than the first display unit 151*a*, resulting in ix) minimizing power consumption and increasing touch convenience. Therefore, the user can check newly-generated events, easily change settings of the mobile terminal, or more easily set settings related to a control mode or an operation mode of the mobile terminal by use of the second display unit 151*b*.

Hereinafter, embodiments of a method of outputting associated information on the first and second display areas will be described in more detail with reference to the accompanying drawings. FIGS. 7A to 7D are conceptual views illustrating a method of interoperably controlling a plurality of areas in a mobile terminal in accordance with an embodiment of the present invention.

As aforementioned, the mobile terminal according to the present invention may include the plurality of display areas 151*a* and 151*b*, and process a touch applied to the first display area 151a in the inactive state as a control command for the second display area 151b in the active state. Meanwhile, the first display area 151a may be larger than the second display area 151b in some embodiments.

The controller 180 in some embodiments may not only process the touch applied to the first display area 151a as the control command for the second display area 151b, but also for outputting information on the first display area 151a which is associated with screen information output on the second display area 151b. That is, detailed information related to the second display area 151b information may additionally be provided or related information which is required for executing a function associated with the second display area 151b information may be provided by use of the first display area 151a.

Figure 7A:
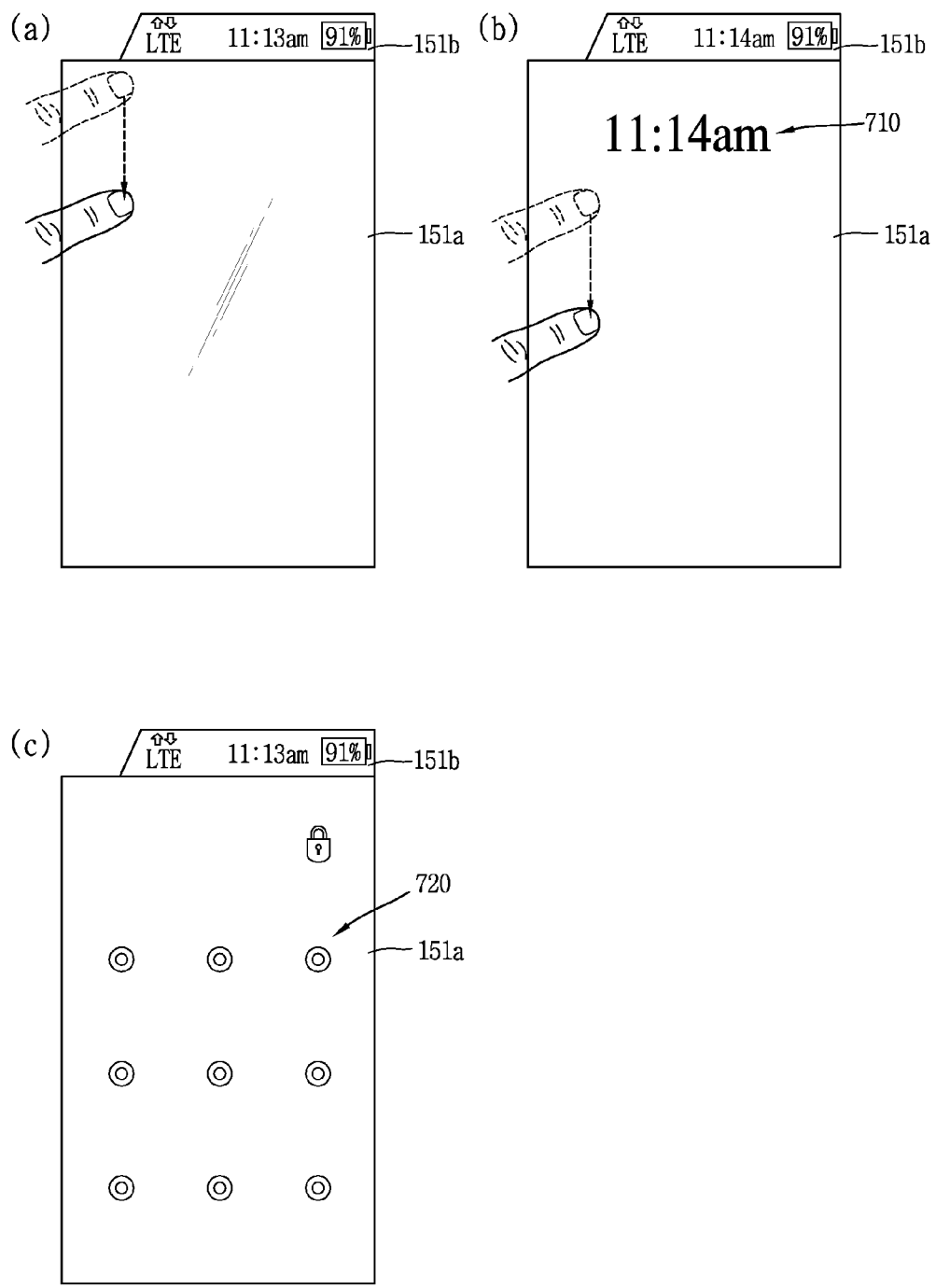
FIGS. 7A, 7B, 7C, and 7D are conceptual views illustrating a method of interoperably controlling a plurality of areas in a mobile terminal in accordance with an embodiment of the present invention.

As one example, as illustrated in (a) of FIG. 7A, while particular screen information (e.g., status information related to the mobile terminal) is output on the second display area 151b, the controller 180 may output detailed information related to the particular screen information on the first display area 151a when a preset touch is applied to the first display area 151a, as illustrated in (b) of FIG. 7A. Alternatively, enlarged information 710 corresponding to the particular screen information may be output on part of the first display area 151a. Here, the information output on the first display area 151a may disappear from the first display area 151a when the touch applied to the first display area 151a is released or when a preset time lapses after the touch applied to the first display area 151a is released.

In another embodiment, the controller 180 may divide the first display area 151a into a plurality of regions. Then, the controller 180 may activate one of the plurality of regions to output the detailed information related to the particular screen information or the enlarged information 710 and deactivate the other divided regions. In some embodiments, a light source or a display portion corresponding to the other regions may remain off. When an additional touch is applied to the first display area 151a as illustrated in (b) of FIG. 7A, the controller 180 may output a lock screen 720, as illustrated in (c) of FIG. 7A. Thus, the controller 180 may process the additional touch as a user input to keep using the first display area 151a.

Figure 7B:
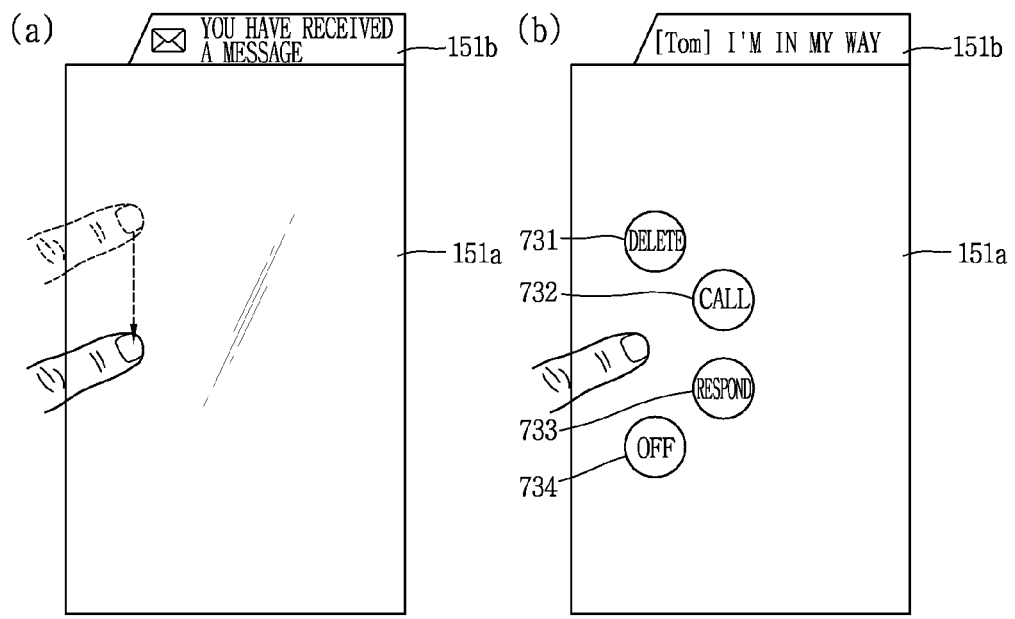

As another example, as illustrated in (a) of FIG. 7B, while particular screen information (e.g., event information) is output on the second display area 151b, the controller 180 may output at least one function icon 731, 732, 733 and 734 associated with a function for the particular screen information when a preset touch is applied to the first display area 151a, as illustrated in (b) of FIG. 7B. Here, the user may select one of the function icons output on the first display area 151a to execute a function associated with the information output on the second display area 151b. For example, event information may be output on the second display area 151b when the event is generated. The controller 180 may output function icons corresponding to functions associated with the event on the first display area 151a in response to a touch applied to the first display area 151a. Here, the function icons output on the first display area 151a may disappear from the first display area 151a when the touch applied to the first display area 151a is released or when a preset time lapses after the touch applied to the first display area 151a is released. Meanwhile, the controller 180 may divide the first display area 151a into a plurality of regions, and the controller 180 may activate one of the divided regions and deactivate the other regions.

In an embodiment, when a preset touch is applied to a region of the first display area 151a on which no function icons are output, as previously illustrated in FIGS. 6A to 6C, the controller 180 may change information output on the second display area 151b. In this case, the output function icons may no longer be displayed. Also, as screen information output on the second display area 151b is changed, the output function icons may be changed to different function icons associated with the changed screen information.

Figure 7C:
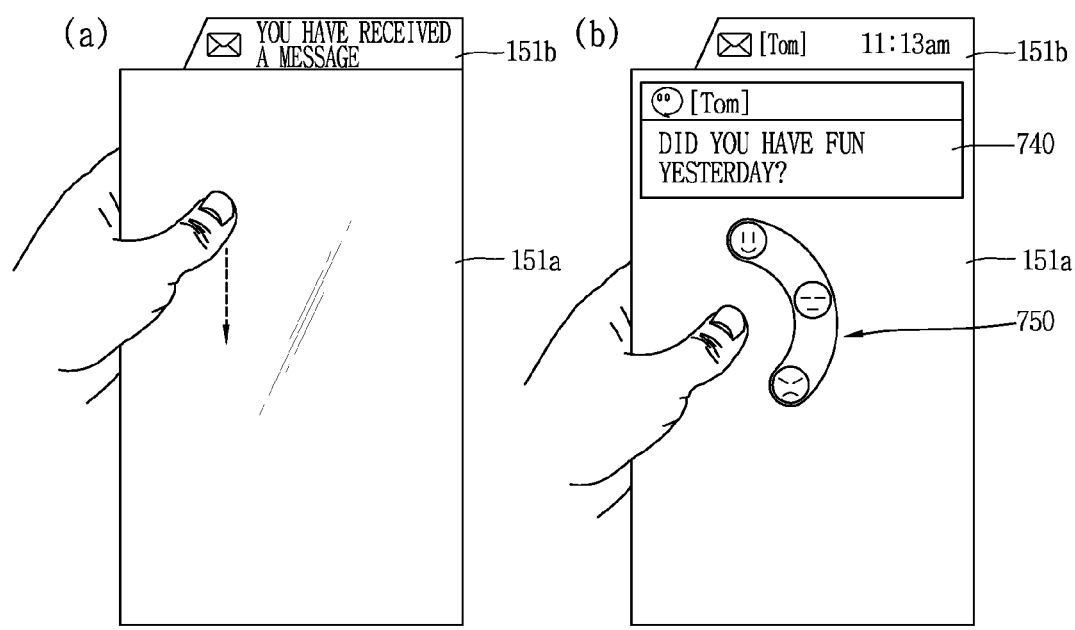

As another example, as illustrated in (a) of FIG. 7C, while particular screen information (e.g., event information) is output on the second display area 151b, the controller 180 may output detailed information 740 related to the particular screen information when a preset touch is applied to the first display area 151a, as illustrated in (b) of FIG. 7C. In addition, the controller ix) 180 may output function icons 750 for performing functions associated with the particular screen information.

In this case, a user may select one of the function icons output on the first display area 151a to execute a function associated with the particular information on the second display area 151b. For example, event information may be output on the second display area 151b in response to generation of the event. The controller 180 may output detailed information and function icons related to the event on at least part of the first display area 151a in response to a touch applied to the first display area 151a. Here, the screen information output on the first display area 151a may disappear from the first display area 151a when the touch applied to the first display area 151a is released or when a preset time lapses after the touch applied to the first display area 151a is released. Meanwhile, the controller 180 may divide the first display area 151a into a plurality of regions, and the controller 180 may activate one of the divided regions and deactivate the other regions.

Further, when a preset touch is applied to a region of the first display area 151a on which no function icons are output, as previously illustrated in FIGS. 6A to 6C, the controller 180 may change information output on the second display area 151b. In this instance, the output function icons may no longer be output. Also, as screen information output on the second display area 151b is changed, the output function icons may be changed to different function icons associated with the changed screen information.

FIG. 7C illustrates an example of an event associated with a message reception. The function icons 750 may be function icons associated with a brief response function to immediately send a response to the received message. In this instance, the controller 180 may send an image corresponding to a selected function icon of the function icons 750 to an originator (sender) of the received message, in response to selection of the function icon. Meanwhile, embodiments of the present invention may not be limited to this, and various other function icons may be displayed, including the icons illustrated in FIG. 7B.

Figure 7D:
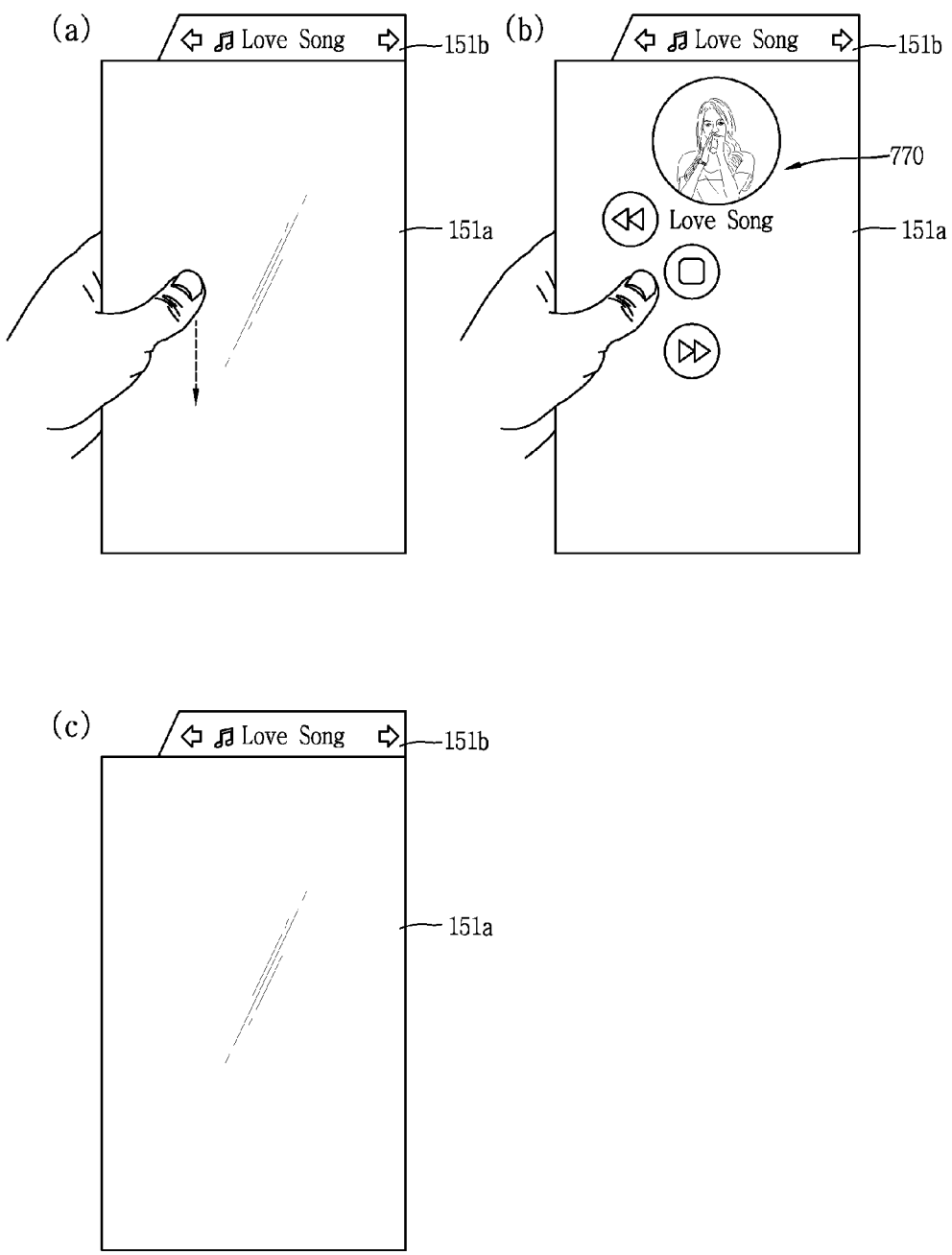

As another example, as illustrated in (a) of FIG. 7D, while screen information related to a music reproduction is output on the second display area 151b, the controller 180 may output graphic user interfaces (GUIs) for controlling the music reproduction on one region of the first display area 151a when a preset touch is applied to the first display area 151a, as illustrated in (b) of FIG. 7D. Screen information output on the first display area 151a may disappear from the first display area 151a when the touch applied to the first display area 151a is released or when a preset time lapses after the touch applied to the first display area 151a is released (see (c) of FIG. 7D). Meanwhile, the controller 180 may divide the first display area 151a into a plurality of regions, and the controller 180 may activate one region to output the function icons and deactivate the other regions.

In addition, when information related to the second display area 151b information is output on the first display area 151a (specifically, when function icons are output) in response to a touch applied to the first display area 151a, the controller 180 may control output positions of the function icons to facilitate selection of those function icons. That is, the controller 180 may output the function icons near a position of the touch to the first display area 151a. Thus, the output positions of the function icons may differ according to the position of the touch applied to the first display area 151a. In some embodiments, a function icon may be selected by a drag touch applied consecutive to the touch applied to the first display area 151a.

Hereinafter, description will be given in more detail of embodiments of a method of controlling an operation mode (a driving mode or a control mode) of the mobile terminal in response to a touch applied to the first display area, with reference to the accompanying drawings. FIGS. 8A to 8G are conceptual views illustrating a plurality of control modes in a mobile terminal in accordance with an embodiment of the present invention.

The mobile terminal may select and execute an operation mode simply by using a touch applied to the first display area 151a and information output on the second display area 151b. Here, the operation mode of the mobile terminal refers to execution of a specific operation (or a function). For example, the operation mode of the mobile terminal may include a watch type mobile terminal control mode, a TV control mode, a camera mode, and the like. (The foregoing description relates to the watch type mobile terminal control mode or the TV control mode as corresponding to the function associated with the control of the external device, but the following description refers to the function associated with the control of the external device also being 'the operation mode of the mobile terminal').

Figure 8A:
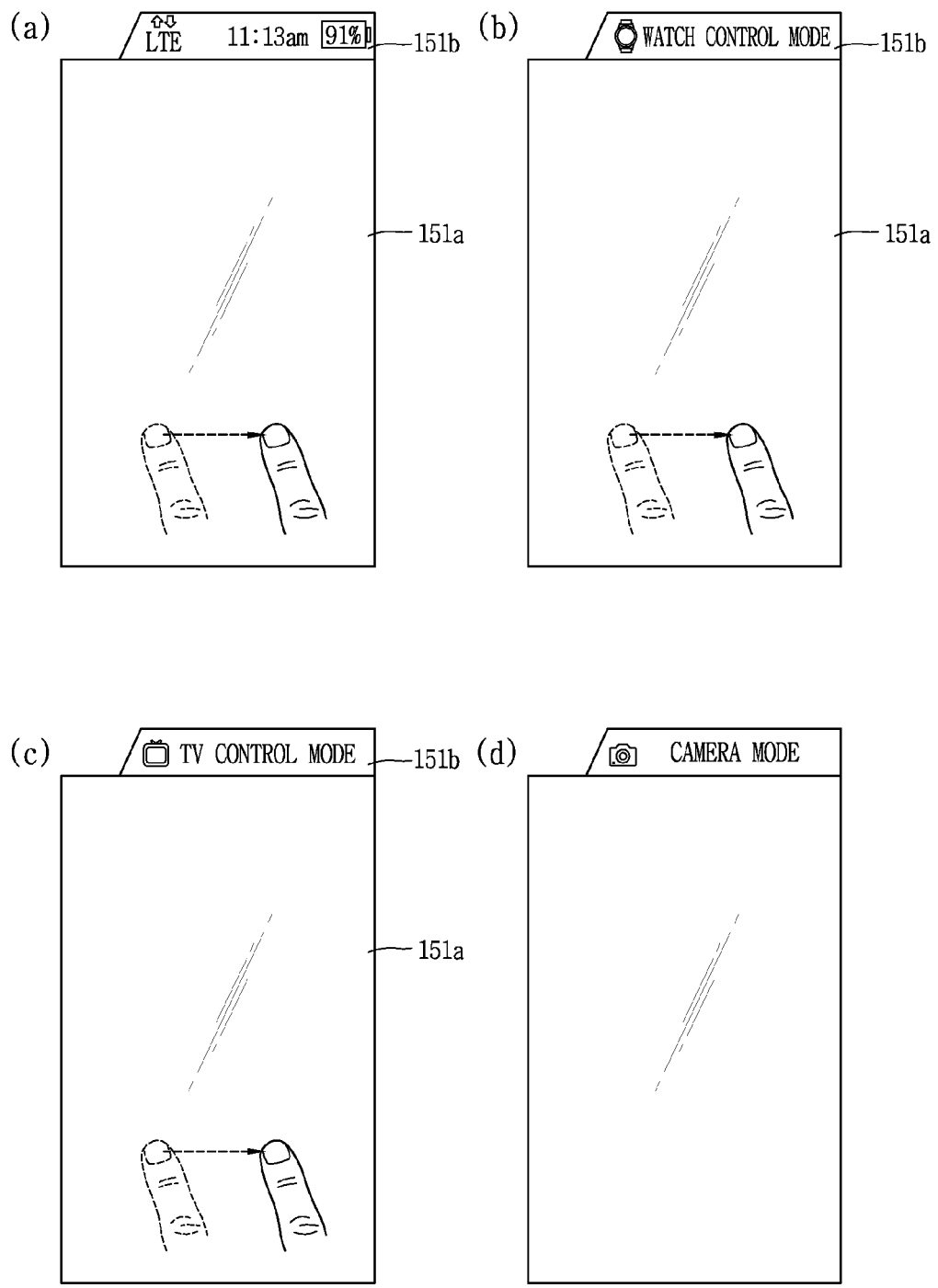
FIGS. 8A, 8B, 8C, 8D, 8E, 8F, and 8G are conceptual views illustrating a plurality of control modes in a mobile terminal in accordance with an embodiment of the present invention.

The mobile terminal according to an embodiment of the present invention, as illustrated in (a), (b), (c) and (d) of FIG. 8A, may switch operation modes based on a touch applied to the first display area 151a. In response to switching of the operation mode of the mobile terminal, mode information corresponding to a current operation mode may be output on the second display area 151b. As illustrated in (a) of FIG. 8A, the controller 180, as illustrated in (b) of FIG. 8A, may execute a watch control mode (or the watch type mobile terminal control mode) when a preset touch is applied to the first display area 151a while a specific operation mode is not executed. In this manner, when the watch control mode is executed, the controller 180 may transmit a control signal to a paired watch type mobile terminal in response to a touch applied to the first display area 151a. Meanwhile, if the mobile terminal is not currently paired with a watch type mobile terminal, the controller 180 may perform a pairing process.

The preset touch may correspond to a touch associated with a control command for executing a specific operation mode of the mobile terminal. The controller 180 may not execute the corresponding operation mode immediately when the preset touch is applied, but may execute the corresponding operation mode when another touch succeeding the preset touch is applied.

In this instance, the preset touch may be a touch for selecting one of a plurality of operation modes and the succeeding touch may be a touch for executing a specific mode. For example, when the preset touch is continuously applied, as illustrated in (c) and (d) of FIG. 8A, the controller 180 may output information related to other modes (e.g., information related to the TV control mode and the camera mode), in addition to the watch control mode.

In this manner, when a preset touch (or a first touch) is applied to the first display area 151a in the inactive state, the controller 180 may process the first touch applied to the first display area 151a as a control command associated with an operation mode (e.g., a watch screen output, a preview image output, etc.) while information related to the operation mode of a plurality of operation modes is output on the second display area 151b. In more detail, while information related to a specific operation mode (e.g., a watch type mobile terminal control mode) is output on the second display area 151b, when a second touch having a different touch attribute from the first touch is applied to the first display area 151a, the controller 180 may switch the information related to the specific operation mode output on the second display area 151b to information related to another second operation mode (e.g., the camera mode). In this state, the controller 180 may process the first touch applied to the first display area 151a as a control command associated with the second operation mode (e.g., the camera mode).

Figure 8B:
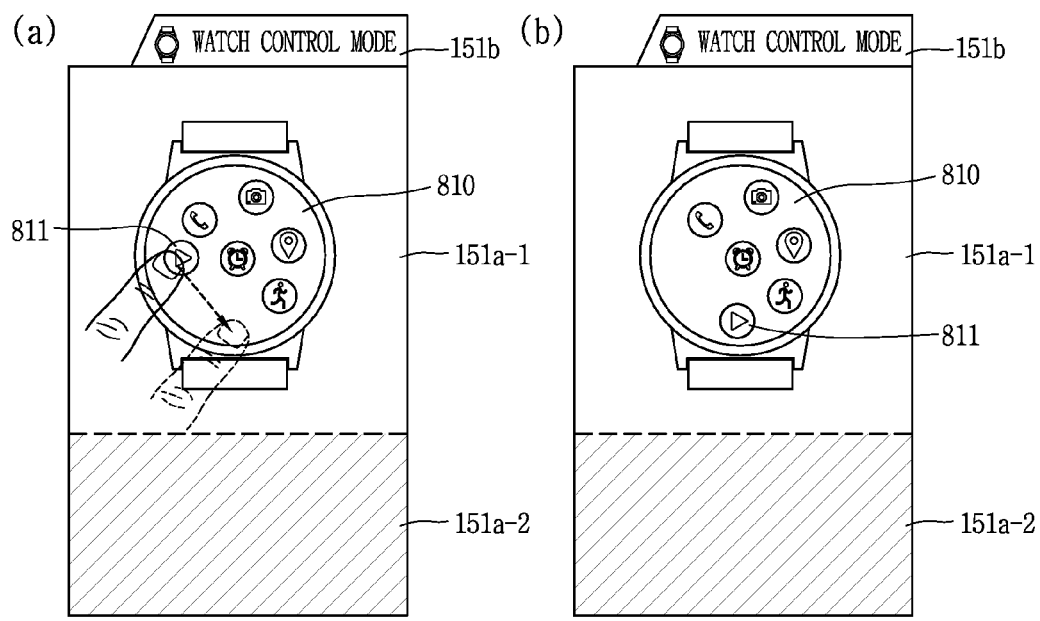
Figure 8C:
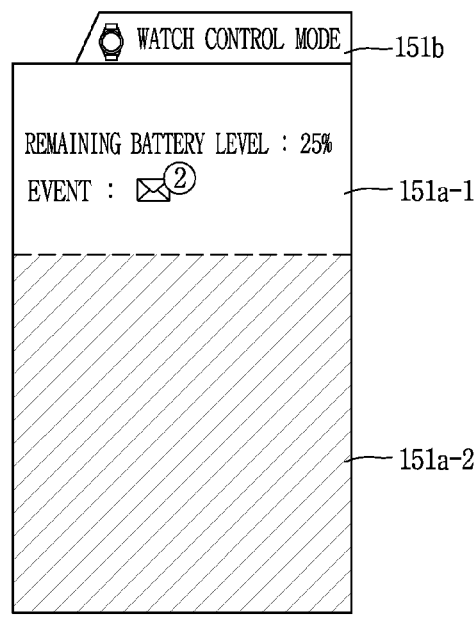
Figure 8D:
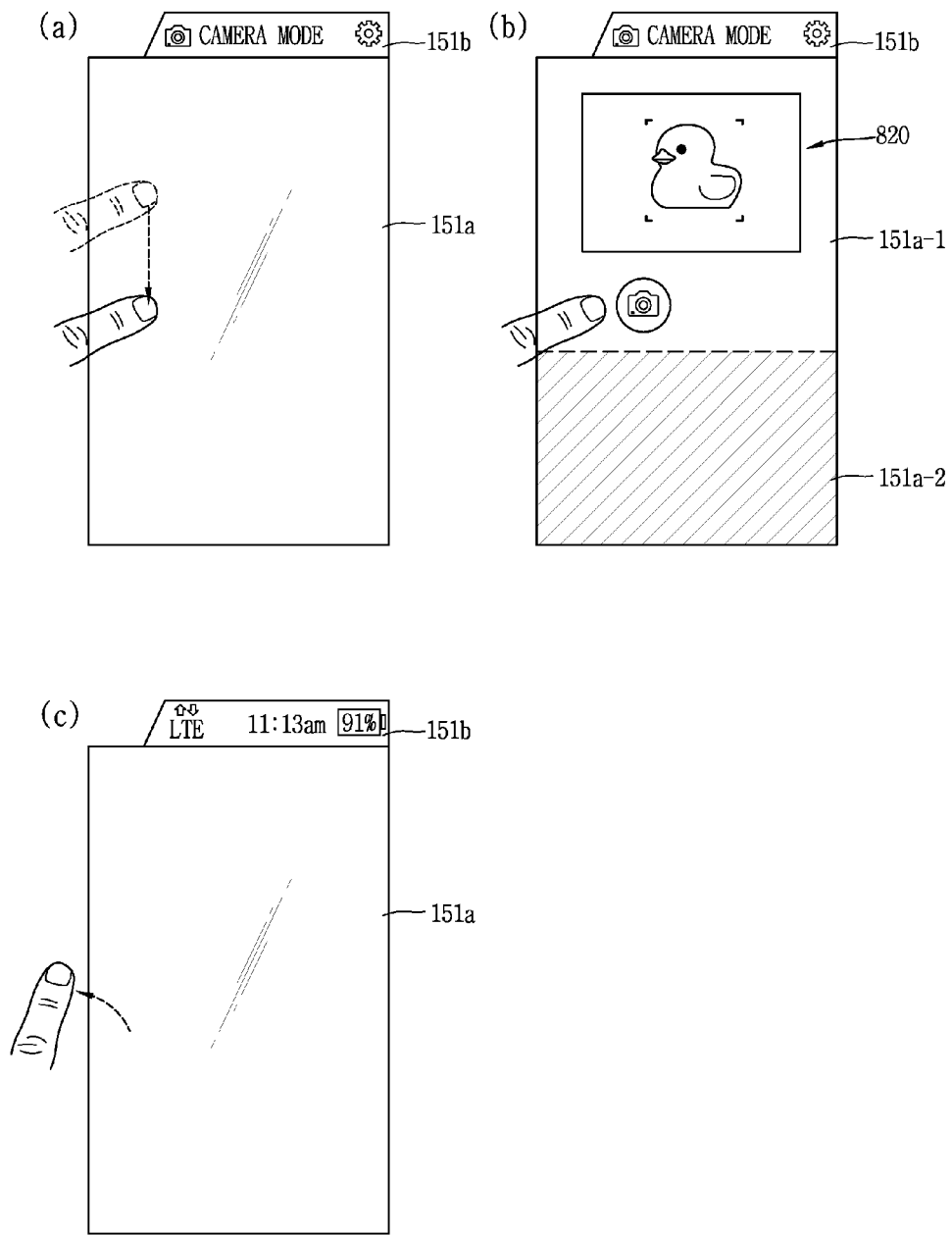

In some embodiments, when the watch control mode is executed, as illustrated in (a) of FIG. 8B, the controller 180 may output screen information 810 related to the control of the watch type mobile terminal on at least one region 151a-1 of the first display area 151a. In this instance, the screen information 810 may be configured to be the same screen as a home screen set on the watch type mobile terminal. The controller 180 may directly control the watch type mobile terminal, such as changing an arrangement of icons 811 on the home screen of the watch type mobile terminal, in response to the touch applied to the first display area 151a.

As another example, when the watch control mode is executed, status information or event information related to the watch type mobile terminal may be output on at least one region 151a-1 of the first display area 151a. The status information and/or the event information related to the watch type mobile terminal may be information received from the watch type mobile terminal in response to the mobile terminal operating in the watch control mode. Meanwhile, the controller 180 may divide the first display area 151a into a plurality of regions, and the controller 180 may activate the one region 151a-1 to output screen information and deactivate the other regions. Here, a light source or portion of the display corresponding to the deactivated region may still be turned off.

When the camera mode is activated the controller 180 may activate a camera. The user may activate the camera mode according to the aforementioned method without having to select a camera function icon so as to immediately execute the image capturing function. In addition, as illustrated in (a) of FIG. 8D, when a preset touch is applied to the first display area 151a, the controller 180, as illustrated in (b) of FIG. 8D, may output a preview image 820 captured via the camera.

In some embodiments, the controller 180 may additionally output a function icon (or a graphic object) through which an image capture command is received. Meanwhile, the screen information (i.e., a preview image or the function icon) output on the first display area 151a may disappear from the first display area 151a when the touch applied to the first display area 151a is released or when a preset time lapses after the touch applied to the first display area 151a is released (see (c) of FIG. 8D). Also, the controller 180 may deactivate the camera when the output of the screen information is ended to reflect the user's intent that the user does not want to perform the image capture function anymore.

Figure 8E:
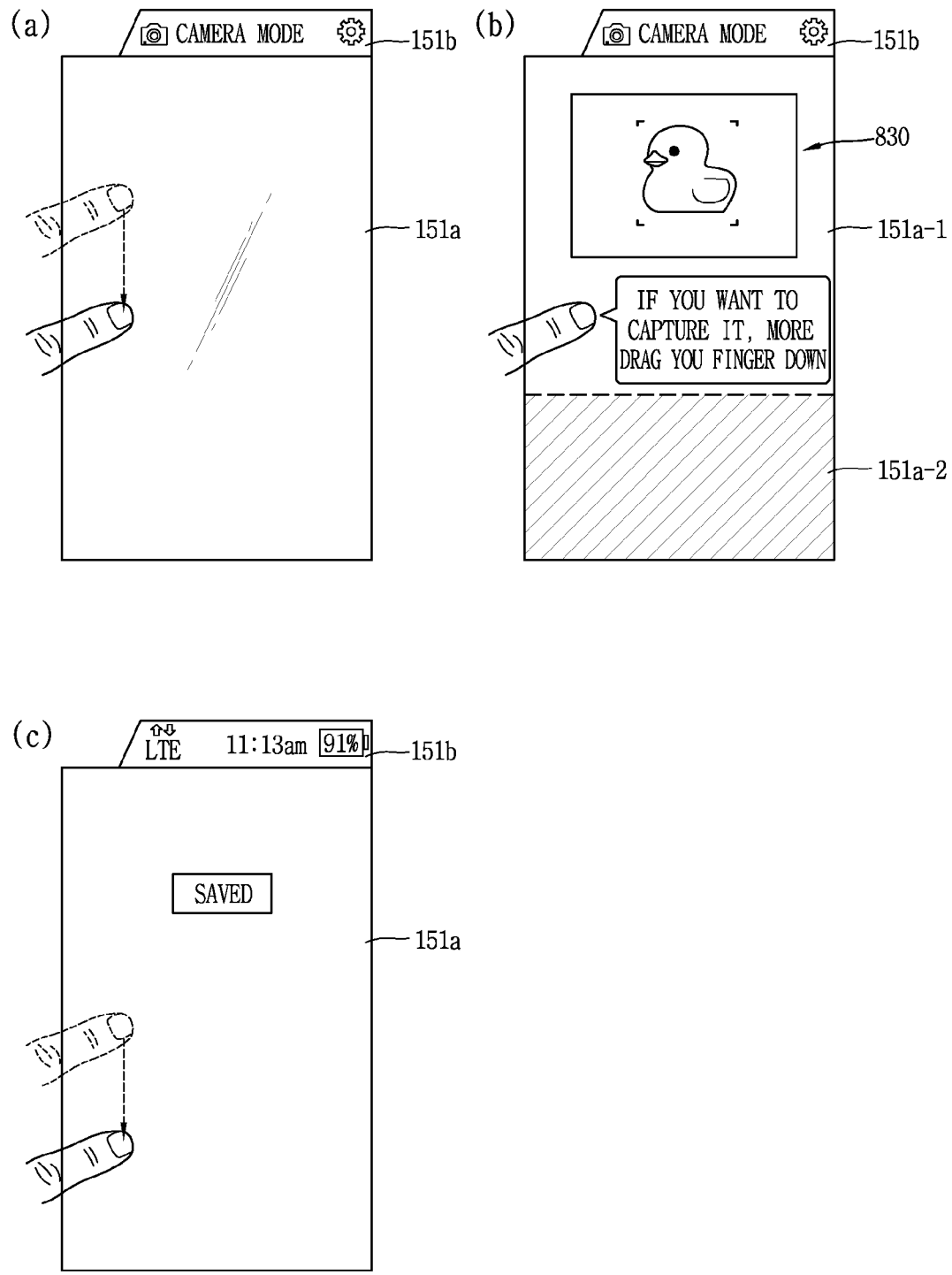

As another example, as illustrated in (b) of FIG. 8E, while the preview image 830 is output, the controller 180 may execute image capturing in response to a preset touch for example, a first touch for outputting a preview image and a second touch consecutive to the first touch (see (c) of FIG. 8E). In this instance, the user can check the preview image and simultaneously apply an image capture command through the consecutive first and second touches, comprising one touch.

In the camera mode, even if the preview image is not output the camera may be in an active state. Here, the controller 180 may execute the image capturing in response to a user input. The user input may be an input applied to a hardware key of the terminal or a preset touch input applied to the display unit.

Figure 8F:
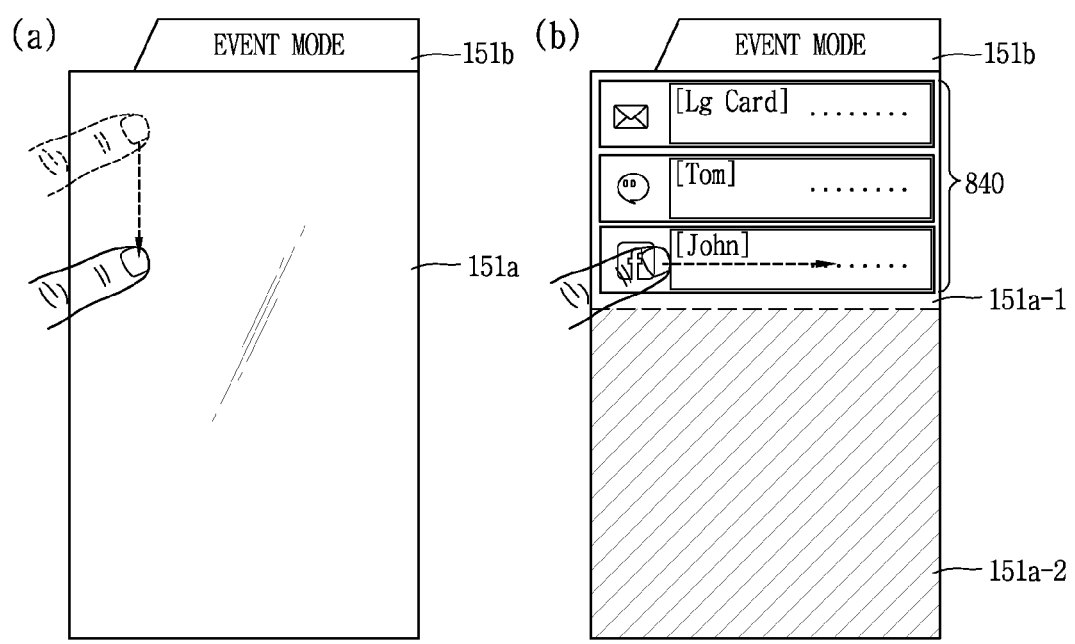

An operation mode according to embodiments of the present invention may include an event mode. The event mode may refer to a mode of outputting event information related to an event generated in the terminal or an event received at the terminal. For example, as illustrated in FIG. 8F, while information notifying that the current operation mode is the event mode is output on the second display area 151b, the controller 180, as illustrated in (e) of FIG. 8F, may output at least one event information on one region 151a-1 of the first display area 151a when a preset touch is applied to the first display area 151a. Here, in response to a touch applied to the output event information, the controller 180 may execute an additional function (e.g., executing a related application, deleting the corresponding event information, and the like) associated with the touch-applied event information. Meanwhile, the controller 180 may divide the first display area 151a into a plurality of regions, and the controller 180 may activate the one region 151a-1 to output screen information and deactivate the other regions 151a-2. Here, a light source or a portion of the display corresponding to the deactivated region 151a-2 may still be turned off.

Figure 8G:
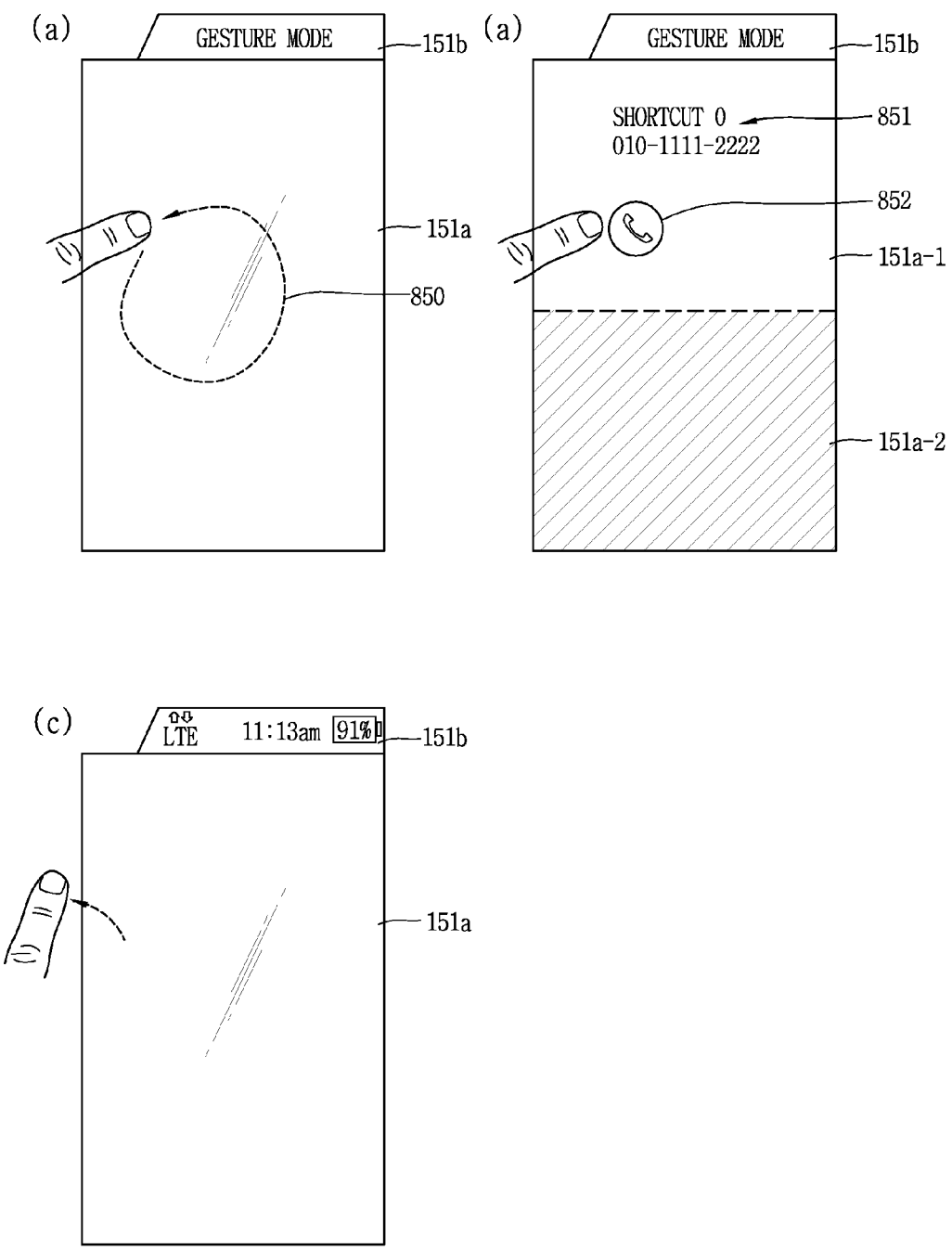

An operation mode according to embodiments of the present invention may include a gesture mode. Here, the gesture mode may refer to a mode of executing a function corresponding to a touch path made via a touch input applied to the first display area 151a. For example, as illustrated in FIG. 8G, while information notifying that the current operation mode is the gesture mode is output on the second display area 151b, when a preset touch 850 with a specific touch path is applied to the first display area 151a, the controller 180, as illustrated in (b) of FIG. 8G, may execute a function corresponding to the specific touch path. The memory 170 may include matching information that associates functions with corresponding touch paths. The controller 180 may execute the function matched with the touch path based on the matching information.

The controller 180 may divide the first display area 151a into a plurality of regions, and the controller 180 may activate the one region 151a-1 to output screen information, and deactivate the other regions 151a-2. Here, a light source or a portion of the display corresponding to the deactivated region 151a-2 may still be turned off.

As described above, in the embodiments of the mobile terminal and the control method thereof according to the present invention, an operation mode related to mode information output on the second display area 151b may be executed. In other words, the operation mode can be switched or executed by changing information output on the second display area 151b, which may facilitate the user to more intuitively control the operation mode of the mobile terminal.

Figure 9A:
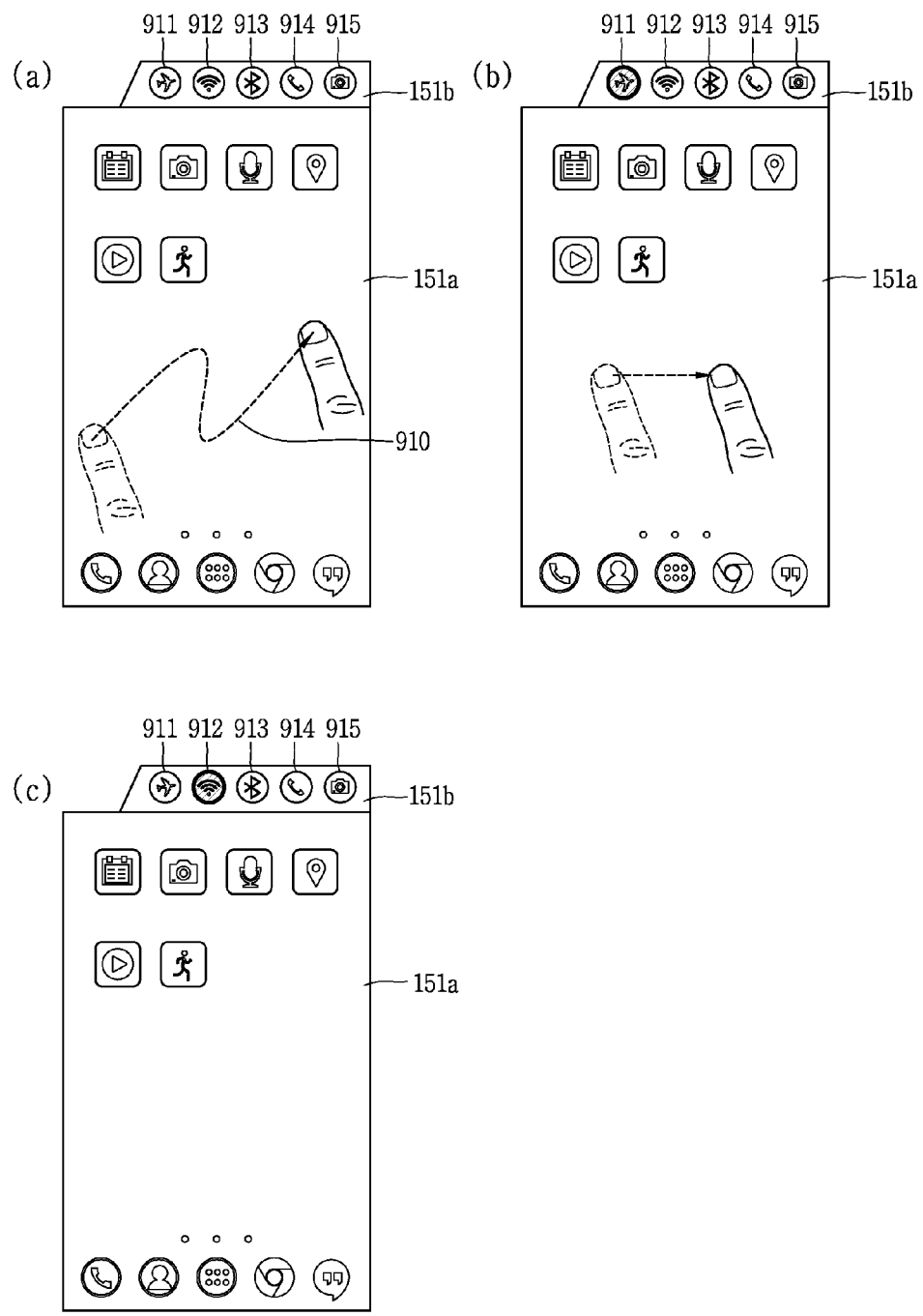
FIGS. 9A, 9B, and 9C are conceptual views illustrating a method of controlling one activated area through another activated area in a mobile terminal in accordance with an embodiment of the present invention.
Figure 9B:
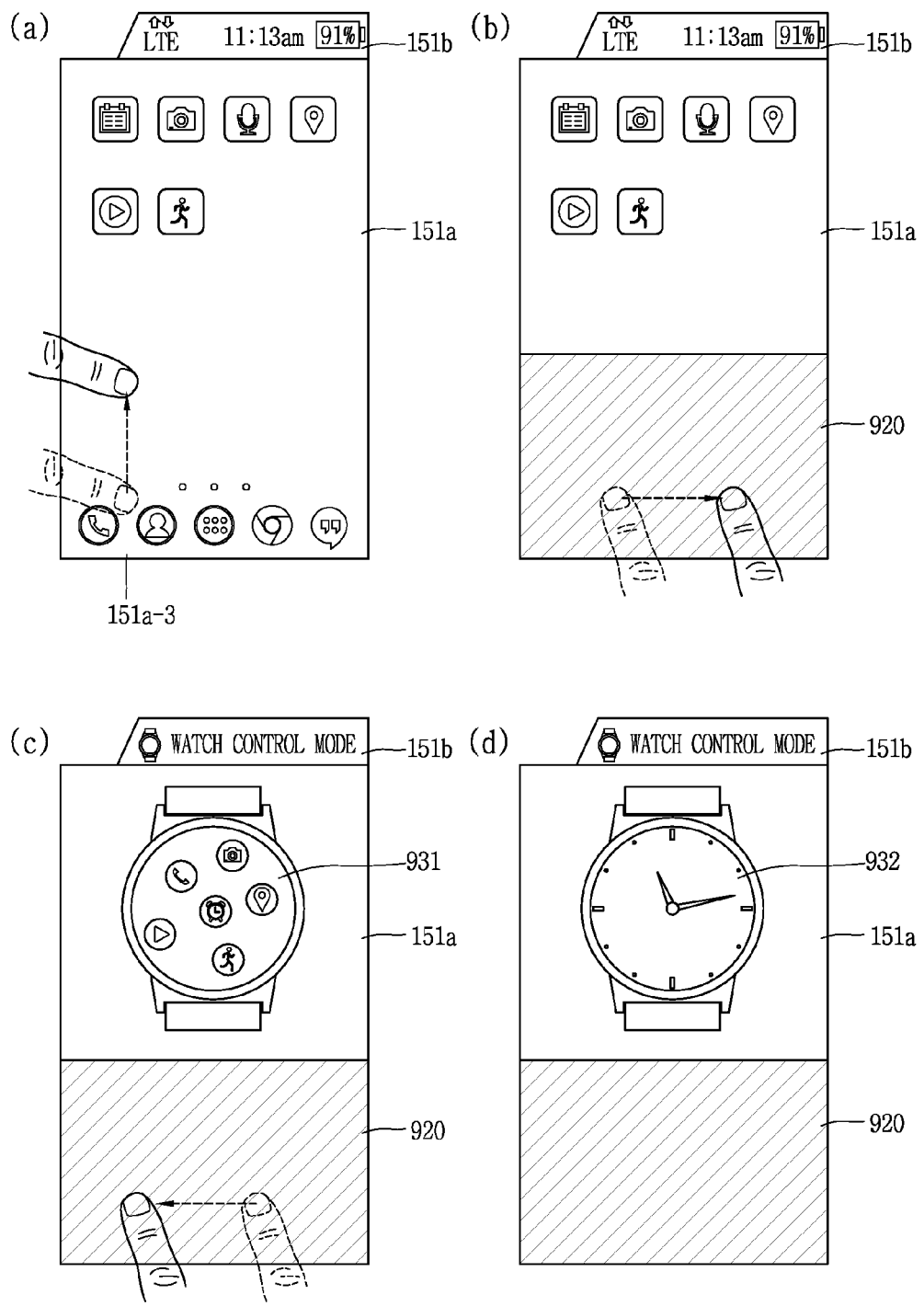
Figure 9C:
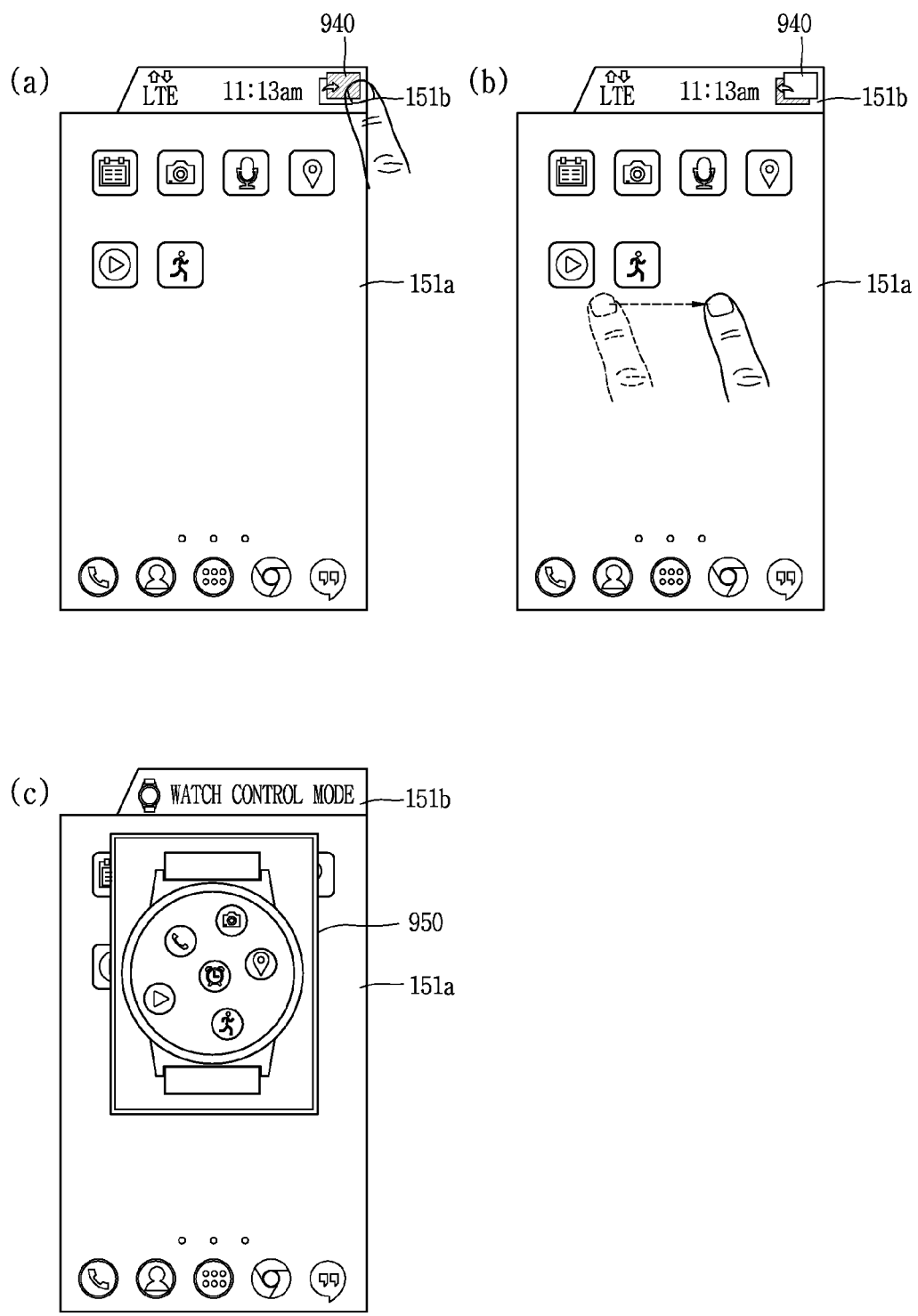

The foregoing description includes embodiments of the method of processing the touch applied to the first display area 151a as the control command for the second display area 151b while the first display area 151a is in the inactive state. The mobile terminal according to embodiments of the present invention may also process a touch applied to the first display area 151a as a control command for the second display area 151b while the first display area 151a is in the active state. FIGS. 9A to 9C are conceptual views illustrating a method of controlling one activated area through another activated area in a mobile terminal in accordance with embodiments of the present invention.

In the mobile terminal according to one embodiment of the present invention, the first display area and the second display area may be in the active state. In some cases, a touch applied to the first display area 151a may be processed as a control command for the second display area 151b. For example, while screen information related to a first application is output on the first display area 151a and screen information related to a second application, different from the first application, is output on the second display area 151b, the controller 180 may process a touch applied to the first display area 151a as a control command associated with the screen information of the second application output on the second display area 151b.

As illustrated in (a) of FIG. 9A, when a preset touch 910 is applied to the first display area 151a, the controller 180 may process the touch applied to the first display area 151a as a control command for the second display area 151b. The controller 180 may output predetermined information on the second display area 151b or the first display area 151a to notify the user that the touch applied to the first display area 151a is processed as a touch for the second display area 151b. For example, the controller 180, as illustrated in (b) of FIG. 9A, may highlight one information item 911 on the second display area 151b. Meanwhile, when the preset touch or another preset touch is applied to the first display area 151a again, the controller 180 may not process the touch applied to the first display area 151a as the control command for the second display area 151b.

That is, in response to a preset touch, the controller 180 may execute a specific mode (e.g., a touch input mode) in which the first display area 151a is used as a touch input element of the second display area 151b. When another preset touch input is additionally applied to the first display area 151a, the controller 180 may release (or terminate) the touch input mode.

As another example, as illustrated in (a) and (b) of FIG. 9B, the controller 180 may output an image object 920 for receiving a touch relating to the second display area 151b on the first display area 151a according to a user request. Here, the user request may be a preset touch. Also, the user request may be a drag touch that starts from an arbitrary area of the display unit.

Meanwhile, the controller 180 may process a touch applied to the image object 920 of the first display area 151a as the control command for the second display area 151b. Also, the controller 180 may process a touch to a point outside of the image object 920 of the first display area 151a as a control command for the first display area 151a. Therefore, as illustrated in (b), (c) and (d) of FIG. 9B, the controller 180 may execute a specific operation mode (e.g., the watch type mobile terminal control mode) of the mobile terminal in response to the touch applied to the image object 920.

When the specific operation mode is executed, as illustrated in (c) and (d) of FIG. 9B, screen information 931 and 932 related to the specific operation mode may be output on the mobile terminal. The output of the screen information may be terminated when the specific operation mode is released. The screen information, as illustrated in (c) of FIG. 9C, may also be output through a popup window 950.

As another example, a touch applied to the first display area 151*a* may be processed as a touch for the second display area 151*b*. That is, the controller 180 may execute or release a specific mode in which the first display area 151*a* is used as a touch input element for the second display area 151*b* by using a specific icon 940 (see FIG. 9C).

The controller 180, as illustrated in (a) and (b) of FIG. 9C, may vary visual appearance of the specific icon 940 to help the user recognize whether or not the mobile terminal is currently in the specific mode.

In this manner, the mobile terminal may process the touch applied to the first display area 151*a* as a control command for the second display area 151*b* even while the first display area 151*a* is in the active state. This may allow the user to control the second display area 151*b* more conveniently.

In some embodiments, the user may execute a certain application on the first display area 151*a* and simultaneously execute a specific operation mode for the mobile terminal by controlling the second display area 151*b*, thereby executing two functions at the same time. In addition, the mobile terminal may output particular screen information on the first display area 151*a* and simultaneously output event information by controlling the second display area 151*b*. This may allow the user to check the event information through the second display area 151*b* without stopping the information output on a main display, for example, the first display area 151*a*.

As described above, embodiments of the present invention may provide screen information relating to different functions on a plurality of display areas, thereby performing different functions on the plurality of display areas, respectively. Therefore, a user may be able to perform and control multiple functions at the same time.

In addition, the user may perform control of the mobile terminal through a secondary display area while still using a primary display area.

Also, according to embodiments of the present invention, a control command for a secondary display area can be received through a primary display area. In this instance, the mobile terminal may receive the control command for the secondary display area through the primary display area which is not currently used or activated. Therefore, the user can control the secondary display area through the primary display area which is not currently used, even without directly applying a touch input to the secondary display area. Accordingly, the mobile terminal according to embodiments of the present invention can receive a control command from the user while avoiding obscuring of the display area.

The aforementioned present invention can be implemented as computer-readable codes in a program-recorded medium. The computer-readable medium may include all types of recording devices each storing data readable by a computer system. Examples of such computer-readable media may include ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the mobile terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
   a display comprising a first display area and a second display area; and
   a controller configured to:
   cause the second display area to display first screen information related to an image capture function while the first display is in an inactive state and the second display is in an active state,
   wherein in the inactive state, the first display area is turned off such that no information is displayed while still being able to detect touch inputs, and
   wherein in the active state, the second display area is turned on to display information and detect touch inputs;
   cause at least part of the first display area to be in the active state and display second screen information related to the first screen information in response to a first touch to the first display area while the first screen information is displayed on the second display area; and
   activate the image capture function and cause at least part of the first display area to display a preview image captured via the camera in response to the first touch.

2. The terminal of claim 1, wherein the controller is further configured to cause the second display area to display information in response to a touch applied to the first display area while the first display area is in the inactive state and the second display area is in the active state.

3. The terminal of claim 2, wherein the controller is further configured to change the displayed information on the second display area in response to the touch to the first display area.

4. The terminal of claim 2, wherein the controller is further configured to cause the second display area to differently display the displayed information based on a touch attribute of the touch to the first display area, the touch attribute corresponding to a touch direction, a touch type, a touch length, or a number of touches.

5. The terminal of claim 1, wherein the controller is further configured to cause the second display area to display:
   notification information related to an event when the event is generated while the first display area is in the inactive state; and
   detailed information related to the event when a second touch is applied to the first display area in the inactive state.

6. The terminal of claim 5, wherein the controller is further configured to cause at least part of the first display area to display at least one function icon for executing a function associated with the event in response to a third touch to the first display area while the detailed information is displayed on the second display area.

7. The terminal of claim 1, wherein the controller is further configured to:
   cause the second display area to display a plurality of function icons;

execute a specific function corresponding to one of the plurality of function icons in response to a second touch to the first display area in the inactive state;

wherein the specific function is executed from the plurality of function icons based on a position of the second touch to the first display area.

8. The terminal of claim 1, wherein the controller is further configured to process a second touch to the first display area in the inactive state as a control command for a specific operation mode wherein the second touch is received while information related to the specific operation mode is displayed on the second display area.

9. The terminal of claim 8, wherein:

the specific operation mode is one of a plurality of operation modes comprising a watch mode and a camera mode, and the controller is further configured to cause the second display area to switch from displaying information of a first mode of the plurality of operation modes to displaying information of a second mode of the plurality of operation modes in response to a third touch to the first display area, wherein the second touch is received while the second display area is displaying information of the first mode.

10. The terminal of claim 1, wherein the controller is further configured to capture an image via the camera in response to a second touch consecutive to the first touch to the first display area.

11. The terminal of claim 1, wherein the second display area is located at a first side of the first display area.

12. A method for controlling a mobile terminal comprising a display having a first display area and a second display area, the method comprising:

displaying first screen information related to an image capture function while the first display is in an inactive state and the second display is in an active state, wherein in the inactive state, the first display area is turned off such that no information is displayed while still being able to detect touch inputs, and wherein in the active state, the second display area is turned on to display information and detect touch inputs;

causing at least part of the first display area to be in the active state and display second screen information related to the first screen information in response to a first touch to the first display area while the first screen information is displayed on the second display area; and activating the image capture function and cause at least part of the first display area to display a preview image captured via the camera in response to the first touch.

* * * * *